(12) United States Patent
Liu et al.

(10) Patent No.: US 11,105,009 B2
(45) Date of Patent: Aug. 31, 2021

(54) GRAPHENE MATERIAL INLAID WITH SINGLE METAL ATOMS AND PREPARING METHOD AND APPLICATION THEREOF

(71) Applicant: DALIAN INSTITUTE OF CHEMICAL PHYSICS, CHINESE ACADEMY OF SCIENCES, Dalian (CN)

(72) Inventors: Bin Liu, Dalian (CN); Hongbin Yang, Dalian (CN); Yanqiang Huang, Dalian (CN); Song Liu, Dalian (CN); Tao Zhang, Dalian (CN)

(73) Assignee: DALIAN INSTITUTE OF CHEMICAL PHYSICS, CHINESE ACADEMY OF SCIENCES, Dalian (CN)

( * ) Notice: Subject to any disclaimer, the term of this patent is extended or adjusted under 35 U.S.C. 154(b) by 232 days.

(21) Appl. No.: 16/325,860

(22) PCT Filed: Dec. 20, 2017

(86) PCT No.: PCT/CN2017/117563
§ 371 (c)(1),
(2) Date: Feb. 15, 2019

(87) PCT Pub. No.: WO2019/024396
PCT Pub. Date: Feb. 7, 2019

(65) Prior Publication Data
US 2019/0186029 A1    Jun. 20, 2019

(30) Foreign Application Priority Data

Aug. 3, 2017 (CN) .......................... 201710655090.1

(51) Int. Cl.
*C25B 11/044* (2021.01)
*C01B 32/184* (2017.01)
(Continued)

(52) U.S. Cl.
CPC .......... *C25B 11/044* (2021.01); *B01J 23/745* (2013.01); *B01J 23/755* (2013.01); *B01J 35/002* (2013.01);
(Continued)

(58) Field of Classification Search
CPC ...... B01J 23/745; B01J 23/755; B01J 35/002; B01J 35/0033; B01J 37/086; C25B 11/14;
(Continued)

(56) References Cited

U.S. PATENT DOCUMENTS

2014/0353144 A1* 12/2014 Nakanishi ............... C25B 11/03
204/252

FOREIGN PATENT DOCUMENTS

CN 10 3172057 * 6/2013 .......... C01B 32/194
CN 103252250 A 8/2013
(Continued)

OTHER PUBLICATIONS

International Search Report dated May 9, 2018 of corresponding International application No. PCT/CN2017/117563; 6 pages.
(Continued)

*Primary Examiner* — Patricia L. Hailey
(74) *Attorney, Agent, or Firm* — Maier & Maier, PLLC

(57) ABSTRACT

The present invention relates to a graphene material inlaid with single metal atoms, the preparation method thereof and its application of being used as the catalyst for the electroreduction of carbon dioxide. The graphene material inlaid with single metal atoms comprises single metal atoms and graphene; the single metal atoms are dispersed in the framework of the graphene; and the graphene is at least one selected from N doped graphene and N and S co-doped graphene. The material is used for the electrochemical reduction reaction of carbon dioxide, which significantly improves the utilization efficiency of the metal atoms and (Continued)

enhances the catalytic activity for the electroreduction of carbon dioxide, improves the catalytic stability, inhibits effectively the hydrogen evolution reaction, improves the selectivity for CO product, and broadens the electric potential window of reducing carbon dioxide to generate CO.

10 Claims, 13 Drawing Sheets

(51) Int. Cl.
    *B01J 37/08*     (2006.01)
    *B01J 35/00*     (2006.01)
    *C01B 32/194*     (2017.01)
    *C01B 32/40*     (2017.01)
    *B01J 23/755*     (2006.01)
    *B01J 23/745*     (2006.01)
    *C25B 1/00*     (2021.01)
    *H01M 4/90*     (2006.01)
    *C25B 11/031*     (2021.01)

(52) U.S. Cl.
CPC ......... *B01J 35/0033* (2013.01); *B01J 37/086* (2013.01); *C01B 32/184* (2017.08); *C01B 32/194* (2017.08); *C01B 32/40* (2017.08); *C25B 1/00* (2013.01); *C25B 11/031* (2021.01); *H01M 4/90* (2013.01); *C01B 2204/22* (2013.01); *C01P 2002/52* (2013.01); *C01P 2002/72* (2013.01); *C01P 2002/85* (2013.01); *C01P 2002/86* (2013.01); *C01P 2004/03* (2013.01); *C01P 2004/04* (2013.01); *C01P 2006/40* (2013.01)

(58) Field of Classification Search
CPC ....... C25B 1/00; C25B 11/035; C01B 32/182; C01B 32/184; C01B 32/194; C01B 32/40; C01B 2204/22; H01M 4/90; C01P 2002/52; C01P 2002/72; C01P 2002/85; C01P 2002/86; C01P 2004/03; C01P 2004/04; C01P 2006/40
USPC .................................................. 502/182, 185
See application file for complete search history.

(56) References Cited

FOREIGN PATENT DOCUMENTS

| CN | 103295756 A | 9/2013 | | |
|---|---|---|---|---|
| CN | 103501901 A | 1/2014 | | |
| CN | 103715436 A | 4/2014 | | |
| CN | 104032324 A | 9/2014 | | |
| CN | 104846393 A | 8/2015 | | |
| CN | 104925784 A | 9/2015 | | |
| CN | 105148991 A | 12/2015 | | |
| CN | 105413730 A | 3/2016 | | |
| CN | 105529475 A | 4/2016 | | |
| CN | 106466617 A | 3/2017 | | |
| CN | 10 6694007 | * | 5/2017 | ............. B01J 23/00 |
| CN | 106645340 A | 5/2017 | | |

OTHER PUBLICATIONS

Wang et al., "Preparation, Characterization and Catalytic Performance of Single-Atom Catalysts", Chinese Journal of Catalysis, 38, 2017, p. 1-12; 12 pages.

First Search dated Feb. 5, 2021 in corresponding Chinese Application No. 2017106550901.

Zhang et al., "Synergistic Increase of Oxygen Reduction Favourable Fe—N Coordination Structures in a Ternary Hybrid Composite of Carbon Nanosphere/Carbon Nanotube/Graphene Sheet", Electronic Supplementary Material (ESI) for Physical Chemistry Chemical Physics, 9 pages.

* cited by examiner

GRAPHENE MATERIAL INLAID WITH SINGLE METAL ATOMS AND PREPARING METHOD AND APPLICATION THEREOF

TECHNICAL FIELD

The present invention refers to a graphene material inlaid with single metal atoms and the preparing method and application thereof, which belongs to material chemistry and electrochemistry field.

BACKGROUND

CO2 is not only a greenhouse gas that damages the ecological environment, but also the carbon resource with the most abundant reserves, and thus the conversion and utilization of it will have a profound influence on the environment and the energy structure of the future society. However, as CO2 is in an energetically stable state and is almost inert, converting it faces great challenges. Electrochemical reduction can not only convert CO2 effectively but also lower down the cost and realize larger scale production.

The product of the electrochemical CO2 conversion is complicated, including substances such as carbon monoxide, formic acid, methane and ethylene. Based on the existing industrial production mode, converting CO2 to CO through highly efficient electrochemical reduction can alleviate the dependency on the technique of producing syngas by methane reforming under high temperature and high pressure. Nowadays, for converting CO2 to CO by electroreduction, the most concerned catalysts are gold, silver and related alloys. Chinese patent CN104846393A disclosed that using an electrode containing Ag can generate nearly 90% of CO, but ionic liquid was needed to be added, and thus caused a relatively heavier pollution; in Chinese patent CN104032324A, polyoxometalate was used as the catalyst, however, the preparation of the catalyst was difficult and the product was complicated. This type of catalysts are overall facing the problems of low activity, low stability, high cost and so on, which make them hard to be applied to the industrial production.

As reported, metallic phthalocyanine compounds, especially nickel phthalocyanine and cobalt phthalocyanine, could effectively catalyze the electroreduction of $CO_2$ to produce CO, but this small molecular compound was not stable under the reduction potential, and could not generate steady and applicable electric current.

To solve the above problems, it is necessary to develop a new type of non-noble metal catalyst with high activity and stability.

SUMMARY

According to an aspect of the present invention, a graphene material inlaid with single metal atoms is provided, wherein the material contains metal inlaid on the graphene in the form of single atoms, which improves the atom utilization significantly and has high catalytic activity when used in the electroreduction reaction of CO2.

The graphene material inlaid with single metal atoms, which contains single metal atoms and graphene.

The single metal atoms are dispersed in the framework of the graphene.

The graphene is at least one selected from N doped graphene and N and S co-doped graphene.

As an embodiment, the single metal atoms are at least one selected from group VIII metals. Preferably, the single metal atoms are at least one selected from Fe, Co and Ni.

Preferably, the mass percentage content of the single metal atoms in the graphene material inlaid with single metal atoms is in a range from 1% to 10%.

More preferably, the mass percentage content of the single metal atoms in the graphene material inlaid with single metal atoms is in a range from 2.5% to 4%.

As an embodiment, the graphene material inlaid with single metal atoms contains a conductive carbon material.

As an embodiment, the conductive carbon material is at least one selected from acetylene black, carbon fiber, carbon nanotube, carbon dust and Ketjen black.

Preferably, the conductive carbon material is at least one selected from KetjenblackEC300J, KetjenblackEC600JD, Carbon ECP and Carbon ECP600JD As an embodiment, the graphene material inlaid with single metal atoms further contains at least one selected from metallic particles and metallic carbides.

As an embodiment, the particle sizes of the metallic particles and the metallic carbides are selected from 1~3 nm.

As an embodiment, the mole number of the metallic element of the single metal atoms and the mole number of the metallic element of the metallic particles have a ratio of 1:0~1.

Preferably, the mole number of the metallic element of the single metal atoms and the mole number of the metallic element of the metallic particles have a ratio of 1:0.

As an embodiment, the mole number of the metallic element of the single metal atoms and the mole number of the metallic element of the metallic carbides have a ratio of 1:0~0.5.

Preferably, the mole number of the metallic element of the single metal atoms and the mole number of the metallic element of the metallic carbides have a ratio of 1:0.

According to another aspect of the present application, a method for preparing graphene material inlaid with single metal atoms is provided. The graphene material inlaid with single metal atoms is prepared by the method of high temperature carbonization. By altering the type and ration of the synthetic precursor, and altering the temperature and atmosphere of the carbonization, morphology and parameters such as the specific surface area of the metal/C catalyst can be adjusted, and the catalytic active site can be changed then. At the same time, since the raw material employed is abundant, the synthetic process is simple and the catalytic ability of the product obtained is outstanding, the method is suitable for industrial application.

The method for preparing graphene material inlaid with single metal atoms at least comprises the following steps:

a) mixing raw material to obtain a precursor;

b) putting the precursor in an inactive atmosphere for high temperature carbonization to obtain the graphene material inlaid with single metal atoms;

the raw material comprises tripolycyanamide and metal salt; or the raw material comprises tripolycyanamide, metal salt and amino acid; or the raw material comprises tripolycyanamide, metal salt, amino acid and conductive carbon material.

Preferably, the amino acid is at least one selected from cysteine, glycine, alanine, phenylalanine and tryptophan.

Preferably, the metal salt is at least one selected from nickel salt, cobalt salt, ferric salt and ferrous salt.

More preferably, the metal salt is at least one selected from nickel acetate, cobalt acetate, ferrous acetate, ferric acetate, nickel nitrate, cobalt nitrate, ferrous nitrate, ferric nitrate, nickel sulfate, cobalt sulfate, ferrous sulfate and ferric sulfate.

Preferably, the conductive carbon material is at least one selected from acetylene black, carbon fiber, carbon nanotube, carbon dust and Ketjen black.

Those skilled in the art can choose the ratio of each substance in the raw material according to practical requirement.

As an embodiment, the mass ratio of the substances in the raw material is:
tripolycyanamide:metal salt:amino acid:conductive carbon material=20~100:1:0~400:0~40.

As an embodiment, the mass ratio of the substances in the raw material is:
tripolycyanamide:metal salt:amino acid:conductive carbon material=60:1:0~12.5:0~4.

Preferably, the mass ratio of the substances in the raw material is:
tripolycyanamide:metal salt:amino acid:conductive carbon material=60:1:11.25~12.5:0~4.

Preferably, the mass ratio of the substances in the raw material is:
tripolycyanamide:metal salt:amino acid:conductive carbon material=60:1:11.25~12.5:2.5~4.

As an embodiment, the mixing in step a) is ball milling mixing.

As an embodiment, the inactive gas used in step b) is at least one selected from nitrogen, argon, helium and xenon.

Preferably, the inactive gas used in step b) is nitrogen and/or argon.

As an embodiment, the high temperature carbonizing in step b) uses one step high temperature carbonizing method or two steps high temperature carbonizing method:

the one step high temperature carbonizing method is: putting the precursor in inactive atmosphere, and heating to a temperature in a range from 800° C. to 1200° C. at a heating rate ranging from 1° C./min to 5° C./min, and then keeping for a time range from 0.5 hours to 5 hours;

the two steps high temperature carbonizing method is: putting the precursor in inactive atmosphere, and heating to a temperature in a range from 350° C. to 650° C. at a heating rate ranging from 1° C./min to 2.5° C., and then keeping for a time range from 0.5 hours ~4 hours; then heating to a temperature in a range from 800 to 1200° C. at a heating rate ranging from 1° C./min to 5° C./min and keeping for a time range from 0.5 hours to 5 hours.

Preferably, the high temperature carbonizing in step b) uses two steps high temperature carbonizing As an embodiment, the high temperature carbonizing in step b) is conducted in a tube furnace.

As a preferred embodiment, the method for preparing graphene material inlaid with single metal atoms further comprises a step of acid treatment, and the step b) is: putting the precursor in the inactive atmosphere for high temperature carbonization; and then being contacted with an acidic solution for acid treatment; and then being put in the inactive atmosphere and being treated at a high temperature in a range from 700° C. to 900° C. for a time range from 10 min to 120 min, to obtain the graphene material inlaid with single metal atoms.

As an embodiment, the acidic solution is at least one selected from hydrochloric acid solution with a concentration in a range from 0.5 mol/L to 5 mol/L, nitric acid solution with a concentration in a range from 0.5 mol/L to 5 mol/L, sulfuric acid solution with a concentration in a range from 0.5 mol/L to 5 mol/L and perchloric acid solution with a concentration in a range from 0.5 mol/L to 5 mol/L;

the acid treatment is carried out at a temperature in a range from 40° C. to 120° C., and the acid treatment time is in a range from 1 h to 48 h.

As a specific embodiment, the method for preparing the graphene material inlaid with single metal atoms comprises: putting tripolycyanamide, amino acid, metal salt and conductive carbon material in a ball mill tank at a certain ratio for ball milling to obtain a homogeneously mixed precursor; then putting the precursor into a zirconia boat in a tube furnace to carry out high temperature carbonization reaction for a certain time; and the obtained sample is acid treated, washed and dried to obtain the graphene material inlaid with single metal atoms.

According to another aspect of the present application, a catalyst for the electroreduction of carbon dioxide is provided, i.e. the application of the graphene material inlaid with single metal atoms in the electroreduction of carbon dioxide is provided. The catalyst for electroreducing carbon dioxide can selectively reduce $CO_2$ to generate CO with a high efficiency, has a Faradic efficiency of 95% or more, and also possesses a relatively high catalytic ability. For example, when bias voltage is −1.0 V (vs. RHE), reduction current generated by unit mass of the catalyst is 1000 $mA/mg_{(catalyst)}$, and current at unit area reaches 100 $mA/cm^2$. Moreover, after 100 hours of running, the activity and the selectivity for the CO product of the carbon dioxide electroreduction catalyst almost stay without any change, and the overall property thereof is better than the catalysts in the art.

The carbon dioxide electroreduction catalyst is characterized in that, it comprises at least one selected from the said graphene material inlaid with single metal atoms and the graphene material inlaid with single metal atoms produced by the said methods.

According to another aspect of the present application, a gas diffusion electrode is provided, which is characterized in that it comprises a conductive carrier and a catalyst;

the catalyst is at least one selected from the above catalysts for electroreduction of carbon dioxide;

the conductive carrier is at least one selected from carbon paper, carbon felt, carbon cloth and carbon fiber.

As an embodiment, the loading dosage of the carbon dioxide electroreduction catalyst on the conductive carrier is in a range from 0.1 $mg/cm^2$ to 10 $mg/cm^2$.

Preferably, the loading dosage of the carbon dioxide electroreduction catalyst on the conductive carrier is in a range from 0.5 $mg/cm^2$ to 1 $mg/cm^2$.

Preferably, the size of the gas diffusion electrode is 0.5 cm×0.5 cm to 10 cm×10 cm.

The method for preparing the gas diffusion electrode at least comprises the following steps:

Coat the slurry comprising the carbon dioxide electroreduction catalyst, water, isopropanol and perfluorinated sulfonic acid resin onto the conductive carrier, and after vacuum drying, the gas diffusion electrode is obtained.

As a specific embodiment, the method for preparing the gas diffusion electrode at least comprises the following steps:

Disperse the graphene material inlaid with single metal atoms into the mixed solution of isopropanol and water, add 1%~10 wt % solution of perfluorinated sulfonic acid resin Nafion and stir to get a mixed solution, then coat the mixed solution onto the conductive carrier, and after vacuum drying, the gas diffusion electrode is obtained.

In the mixed solution of isopropanol and water, the volume ratio of isopropanol and water is isopropanol:water of 0.2~5:1.

The ratio of the graphene material inlaid with single metal atoms to the mixed solution of isopropanol and water is 0.5 mg~20 mg:1 mL.

The volume ratio of the 1 wt %~10 wt % solution of perfluorinated sulfonic acid resin Nafion to the solution of isopropanol and water is 1:10~100.

The vacuum drying is to dry at 60~120° C., under vacuum condition.

According to another aspect of the present application, application of the carbon dioxide electroreduction catalyst and the gas diffusion electrode in the preparation of carbon monoxide through the electroreduction of carbon dioxide is provided.

The advantageous effects of the present application include but are not limited to:

(1) In the graphene material inlaid with single metal atoms provided by the present application, the metal is inlaid on the graphene in the form of single atoms, which improves the atom utilization significantly.

(2) In the method for preparing the graphene material inlaid with single metal atoms provided by the present application, the graphene material inlaid with single metal atoms is prepared by the method of high temperature carbonization. By altering the type and ration of the synthetic precursor, and altering the temperature and atmosphere of the carbonization, morphology and parameters such as the specific surface area of the metal/C catalyst can be adjusted, and the catalytic active site can be changed then.

(3) In the method for preparing the graphene material inlaid with single metal atoms provided by the present application, the raw material employed is abundant, the synthetic process is simple, the properties of the obtained product is stable and the catalytic ability is outstanding, and thus the method is suitable for industrial application.

(4) The carbon dioxide electroreduction catalyst provided by the present application can selectively reduce $CO_2$ to generate CO with a high efficiency, has a Faradic efficiency of 95% or more, and also possesses a relatively high catalytic ability. For example, when bias voltage is −1.0 V (vs. RHE), reduction current generated by unit mass of the catalyst is 1000 $mA/mg_{(catalyst)}$, and current at unit area reaches 100 $mA/cm^2$.

(5) After 100 hours of running, the activity and the selectivity for the CO product of the carbon dioxide electroreduction catalyst provided by the present application almost stay without any change, and the overall property thereof is better than the known catalysts.

DETAILED DESCRIPTION

Figure 1:
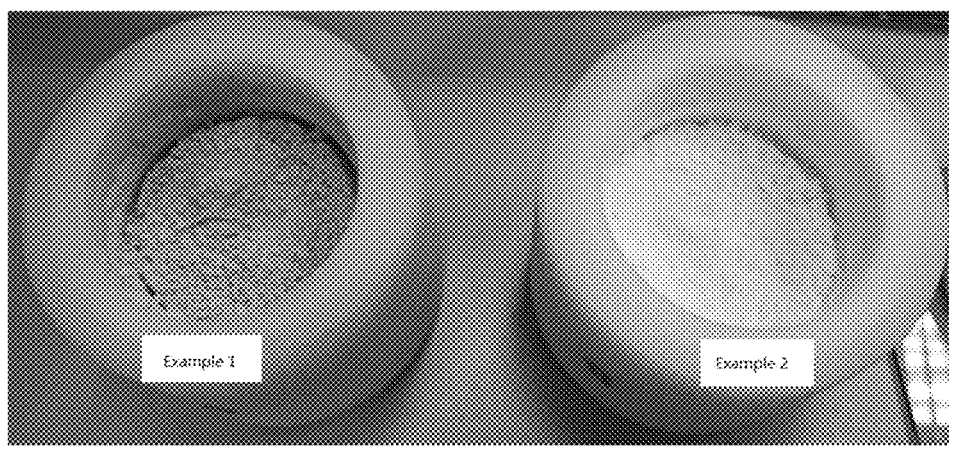
FIG. 1 is a photograph the precursor samples P1[#] and P2[#].

The present invention is further illustrated with specific Examples as follows. It should be understood that these Examples are only used for the illustration of the present invention, but not to limit the scope of the present invention. Additionally, it should be understood that, after reviewing the disclosure of the present invention, those skilled in the art can make various amendments or modifications, and these equivalent forms also fall into the scope as defined by the appending claims of the present application.

Unless stated otherwise, the raw materials in the Examples were all commercially available and directly used without any treatment.

Unless stated otherwise, the using conditions of all the apparatus were recommended conditions of the manufacturers.

In the Examples, Bruker company's X-ray diffractometer AXS D8 Advance was used for the X-ray powder diffraction (XRD) phase analysis of the samples, wherein the conditions were Cu K$\alpha$ radiation ($\lambda$=0.15418 nm), voltage 40 KV and current 40 mA.

JEOL FESEM, JEOL company's JSM-6700F scanning electron microscope was used for the scanning electron microscopy (SEM) test of the samples, wherein the voltage was 5.1 KV.

Veeco company's (Santa Barbara, Calif.) atomic force microscope Nanoman was used for the atomic force microscopy (AFM) test of the samples on tapping mode.

JEOL company's JEM-2100F transmission electron microscope was used for the transmission electron microscopy (TEM) test of the samples. The acceleration voltage was 200 kV.

Thermo Fisher Scientific company's photoelectron spectrometer was used for the X-ray photoelectron spectroscopy (XPS) test of the samples, wherein the conditions were ESCALAB 250 photoelectron spectrometer, Al K$\alpha$ radiation (1486.6 eV).

Electron paramagnetic resonance spectroscopy (EPR) was taken at room temperature and 77K using Bruker company's Elexsys 580 electron paramagnetic resonance spectrometer. The microwave frequency was 9.86 GHz (X-band), and the power was 20 mW.

X-ray absorption near edge spectra (XANES) and the extended X-ray absorption fine structure spectra (EXAFS) of the samples were obtained by BL17C synchrotron radiation from Taiwan Synchrotron Radiation Research Center through fluorescence spectra measuring mode.

Nickel phthalocyanine (85%) samples adopted in the Examples were purchased from Merck company.

The N doped graphene with Ni loaded samples adopted in the Examples were prepared by the following process: 100 mg graphene oxide was dispersed in 30 mL deionized water by ultrasonic, and then 2.5 mg nickel (II) acetate tetrahydrate was added. The mixed solution was stirred at 80° C. for 2 hours and then freeze dried to remove the solvent. 500 mg tripolycyanamide was added to the freeze dried mixture and then ground uniformly. Finally, mixture of graphene oxide, nickel acetate and tripolycyanamide was heated to 900° C. with a 5° C./minute heating rate in a tube furnace (Carbolite, UK) under argon atmosphere and kept for 2 hours, and cooled naturally. The material was then taken out and N doped graphene with Ni loaded sample was obtained.

Example 1 Preparation of the Precursor Sample P1#

Preparation of the metal (Ni)/carbon catalytic material precursor: 24 g tripolycyanamide, 5 g cysteine and 0.4 g nickel acetate were put in a ball mill tank and then ball milled on a ball mill, wherein the ball milling rotate speed was 100 rpm/min and the ball milling time was 2 h, and the catalytic material precursor was obtained after fully mixing and denoted as sample P1#.

Example 2 Preparation of the Precursor Sample P2#

Preparation of the metal (Ni)/carbon catalytic material precursor: 24 g tripolycyanamide, 4.5 g glycine and 0.4 g nickel acetate were put in a ball mill tank and then ball milled on a ball mill, wherein the ball milling rotate speed was 100 rpm/min and the ball milling time was 2 h, and the catalytic material precursor was obtained after fully mixing and denoted as sample P2#.

The photograph of the precursor samples P1# and P2# were shown in FIG. 1, wherein Example 1 was in correspondence with sample P1# and Example 2 was in correspondence with sample P2#.

Example 3 Preparation of the Precursor Sample P3#

Preparation of the metal (Ni)/carbon catalytic material precursor: 24 g tripolycyanamide, 5 g cysteine, 0.4 g nickel acetate and 1 g conductive carbon material (e.g. Ketjen black (KetjenblackEC300J) were put in a ball mill tank and then ball milled on a ball mill, wherein the ball milling rotate speed was 100 rpm/min and the ball milling time was 2 h, and the carbon loaded catalytic material precursor was obtained after fully mixing and denoted as sample P3#.

Example 4 Preparation of the Graphene Material Inlaid with Single Metal Atoms Sample NiC1#

24 g tripolycyanamide, 5 g cysteine and 0.4 g nickel acetate were put in a ball mill tank and then ball milled on a ball mill, wherein the ball milling rotate speed was 100 rpm/min and the ball milling time was 2 h, and the catalytic material precursor was obtained after fully mixing. The precursor was transferred into a zirconia boat, then put into a tube furnace, and Ar gas was passed through at a flow rate of 25 mL/min. Subsequently, it was heated to 600° C. at a heating rate of 2.5° C./min and kept for 2 h, then heated to 900° C. at a heating rate of 2° C./min and kept for 1 h, and then cooled naturally. Metal (Ni)/carbon material was obtained and taken out, which was the catalytic material for the electroreduction of $CO_2$. It was named as metal (Ni)/carbon-raw catalyst –900° C. and denoted as sample NiC1#.

Example 5 Preparation of the Graphene Material Inlaid with Single Metal Atoms Sample NiC2#

24 g tripolycyanamide, 5 g cysteine and 0.4 g nickel acetate were put in a ball mill tank and then ball milled on a ball mill, wherein the ball milling rotate speed was 100 rpm/min and the ball milling time was 2 h, and the catalytic material precursor was obtained after fully mixing. The precursor was transferred into a zirconia boat, then put into a tube furnace, and Ar gas was passed through at a flow rate of 25 mL/min. Subsequently, it was heated to 600° C. at a heating rate of 2.5° C./min and kept for 2 h, then heated to 900° C. at a heating rate of 2° C./min and kept for 1 h, and then cooled naturally. Metal (Ni)/carbon material was obtained and taken out. 400 mg of the obtained metal(Ni)/carbon material was weighed and put into 200 mL of 1M HCl. The mixture was stirred for 24 h under the condition of 80° C. oil bath, then filtered, washed by deionized water, vacuum dried and then put into a zirconia boat. Subsequently, it was heated to 800° C. at a heating rate of 2.5° C./min in a tube furnace, and after being kept for 1 h, it was cooled naturally to obtain the metal/carbon catalyst, which was the catalytic material for the electroreduction of $CO_2$. It was named as metal(Ni)/N,S doped carbon-optimized catalyst-900° C., and denoted as sample C2[#].

Example 6 Preparation of the Graphene Material Inlaid with Single Metal Atoms Sample NiC3[#]

24 g tripolycyanamide, 4.5 g glycine and 0.4 g nickel acetate were put in a ball mill tank and then ball milled on a ball mill, wherein the ball milling rotate speed was 100 rpm/min and the ball milling time was 2 h, and the catalytic material precursor was obtained after fully mixing. The precursor was transferred into a zirconia boat, then put into a tube furnace, and Ar gas was passed through at a flow rate of 25 mL/min. Subsequently, it was heated to 600° C. at a heating rate of 2.5° C./min and kept for 1 h, then heated to 900° C. at a heating rate of 2° C./min and kept for 1 h, and then cooled naturally. Metal/carbon material was obtained and taken out. 400 mg of the obtained metal(Ni)/carbon material was weighed and put into 200 mL of 1M HCl. The mixture was stirred for 24 h under the condition of 80° C. oil bath, then filtered, washed by deionized water, vacuum dried and then put into a zirconia boat. Subsequently, it was heated to 800° C. at a heating rate of 2.5° C./min in a tube furnace, and after being kept for 1 h, it was cooled naturally to obtain the metal/carbon catalyst, which was the catalytic material for the electroreduction of $CO_2$. It was named as metal (Ni)/N doped carbon-optimized catalyst-900° C., and denoted as sample C3[#].

Example 7 Preparation of the Graphene Material Inlaid with Single Metal Atoms Sample NiC4[#]

24 g tripolycyanamide, 5 g cysteine and 0.4 g nickel acetate were put in a ball mill tank and then ball milled on a ball mill, wherein the ball milling rotate speed was 100 rpm/min and the ball milling time was 2 h, and the catalytic material precursor was obtained after fully mixing. The precursor was transferred into a zirconia boat, then put into a tube furnace, and Ar gas was passed through at a flow rate of 25 mL/min. Subsequently, it was heated to 600° C. at a heating rate of 2.5° C./min and kept for 2 h, then heat to 1000° C. at a heating rate of 2° C./min and kept for 1 h, and then cooled naturally. Metal (Ni)/carbon material was obtained and taken out, which was the catalytic material for the electroreduction of $CO_2$. It was named as metal (Ni)/carbon-N doped-raw catalyst −1000° C. and denoted as sample NiC4[#].

Example 8 Preparation of the Graphene Material Inlaid with Single Metal Atoms Sample NiC5[#]

24 g tripolycyanamide, 5 g cysteine and 0.4 g nickel acetate were put in a ball mill tank and then ball milled on a ball mill, wherein the ball milling rotate speed was 100 rpm/min and the ball milling time was 2 h, and the catalytic material precursor was obtained after fully mixing. The precursor was transferred into a zirconia boat, then put into a tube furnace, and Ar gas was passed through at a flow rate of 25 mL/min. Subsequently, it was heated to 600° C. at a heating rate of 2.5° C./min and kept for 2 h, then heated to 1000° C. at a heating rate of 2° C./min and kept for 1 h, and then cooled naturally. Metal/carbon material was obtained and taken out. 400 mg of the obtained metal/carbon material was weighed and put into 200 mL of 1M HCl. The mixture was stirred for 24 h under the condition of 80° C. oil bath, then filtered, washed by deionized water, vacuum dried and then put into a zirconia boat. Subsequently, it was heated to 800° C. at a heating rate of 2.5° C./min in a tube furnace, and after being kept for 1 h, it was cooled naturally to obtain the metal/carbon catalyst, which was the catalytic material for the electroreduction of $CO_2$. It was named as metal(Ni)/carbon-N doped-optimized catalyst-1000° C., and denoted as sample NiC5[#].

Example 9 Preparation of the Graphene Material Inlaid with Single Metal Atoms Sample NiC6[#]

24 g tripolycyanamide, 5 g cysteine and 0.4 g nickel acetate were put in a ball mill tank and then ball milled on a ball mill, wherein the ball milling rotate speed was 100 rpm/min and the ball milling time was 2 h, and the catalytic material precursor was obtained after fully mixing. The precursor was transferred into a zirconia boat, then put into a tube furnace, and Ar gas was passed through at a flow rate of 25 mL/min. Subsequently, it was heated to 600° C. at a heating rate of 2.5° C./min and kept for 2 h, then heated to 900° C. at a heating rate of 2° C./min and kept for 1 h, and then cooled naturally. Metal/carbon material was obtained and taken out. 400 mg of the obtained metal(Ni)/carbon material was weighed and put into 200 mL of 1M $HNO_3$. The mixture was stirred for 24 h under the condition of 80° C. oil bath, then filtered, washed by deionized water, vacuum dried and then put into a zirconia boat. Subsequently, it was heated to 800° C. at a heating rate of 2.5° C./min in a tube furnace, and after being kept for 1 h, it was cooled naturally to obtain the metal/carbon catalyst, which was the catalytic material for the electroreduction of $CO_2$. It was named as metal(Ni)/N doped-carbon-optimized $HNO_3$ catalyst-900° C., and denoted as sample NiC6[#].

Example 10 Preparation of the Graphene Material Inlaid with Single Metal Atoms Sample NiC7[#]

24 g tripolycyanamide, 5 g cysteine and 0.4 g nickel acetate were put in a ball mill tank and then ball milled on a ball mill, wherein the ball milling rotate speed was 100 rpm/min and the ball milling time was 2 h, and the catalytic material precursor was obtained after fully mixing. The precursor was transferred into a zirconia boat, then put into a tube furnace, and Ar gas was passed through at a flow rate of 25 mL/min. Subsequently, it was heated to 600° C. at a heating rate of 2.5° C./min and kept for 2 h, then heated to 900° C. at a heating rate of 2° C./min and kept for 1 h, and then cooled naturally. Metal (Ni)/carbon material was obtained and taken out. 400 mg of the obtained metal(Ni)/carbon material was weighed and put into 200 mL of 1M $H_2SO_4$. The mixture was stirred for 24 h under the condition of 80° C. oil bath, then filtered, washed by deionized water, vacuum dried and then put into a zirconia boat. Subsequently, it was heated to 800° C. at a heating rate of 2.5°

C./min in a tube furnace, and after being kept for 1 h, it was cooled naturally to obtain the metal/carbon catalyst, which was the catalytic material for the electroreduction of $CO_2$. It was named as metal(Ni)/carbon-optimized $H_2SO_4$catalyst-900° C., and denoted as sample NiC7#.

Example 11 Preparation of the Graphene Material Inlaid with Single Metal Atoms Samples FeC1#~FeC7#

The operation process and the ratio of the raw materials were respectively identical to those in Examples 4~11, except for using ferric acetate to replace nickel acetate. A series of corresponding metal(Fe)/carbon-N doped catalysts was prepared and denoted respectively as FeC1#~FeC7#.

Example 12 Preparation of the Graphene Material Inlaid with Single Metal Atoms Samples CoC1#~CoC7#

The operation process and the ratio of the raw materials were respectively identical to those in Example 4~11, except for using cobalt acetate to replace nickel acetate. A series of corresponding metal(Co)/carbon-N doped catalysts was prepared and denoted respectively as CoC1#~CoC7#.

Example 13 Preparation of the Graphene Material Inlaid with Single Metal Atoms Sample NiC8#

24 g tripolycyanamide, 4.5 g glycine, 0.4 g nickel acetate and 1.6 g KEtjen black (KetjenblackEC300J) were put in a ball mill tank and then ball milled on a ball mill, wherein the ball milling rotate speed was 100 rpm/min and the ball milling time was 2 h, and the carbon loaded catalytic material precursor was obtained after fully mixing. The precursor was transferred into a zirconia boat, then put into a tube furnace, and Ar gas was passed through at a flow rate of 25 mL/min. Subsequently, it was heated to 600° C. at a heating rate of 2.5° C./min and kept for 2 h, then heat to 900° C. at a heating rate of 2° C./min and kept for 1 h, and then cooled naturally. Carbon loaded metal (Ni)/carbon material was obtained and taken out, which was the catalytic material for the electroreduction of $CO_2$. It was named as carbon loaded metal (Ni)/N doped-carbon-raw catalyst-900° C. and denoted as sample NiC8#.

Example 14 Preparation of the Graphene Material Inlaid with Single Metal Atoms Sample NiC9#

24 g tripolycyanamide and 0.4 g nickel acetate were put in a ball mill tank and then ball milled on a ball mill, wherein the ball milling rotate speed was 100 rpm/min and the ball milling time was 2 h, and the catalytic material precursor was obtained after fully mixing. The precursor was transferred into a zirconia boat, then put into a tube furnace, and Ar gas was passed through at a flow rate of 25 mL/min Subsequently, it was heated to 600° C. at a heating rate of 2.5° C./min and kept for 2 h, then heated to 900° C. at a heating rate of 2° C./min and kept for 1 h, and then cooled naturally. Metal (Ni)/carbon material was obtained and taken out. It was named as non-amino acid-metal(Ni)/N doped-carbon catalyst, and was denoted as NiC9#.

Example 15 Preparation of the Graphene Material Inlaid with Single Metal Atoms Sample NiC10#

24 g tripolycyanamide, 4.5 g glucose and 0.4 g nickel acetate were put in a ball mill tank and then ball milled on a ball mill, wherein the ball milling rotate speed was 100 rpm/min and the ball milling time was 2 h, and the catalytic material precursor was obtained after fully mixing. The precursor was transferred into a zirconia boat, then put into a tube furnace, and Ar gas was passed through at a flow rate of 25 mL/min. Subsequently, it was heated to 600° C. at a heating rate of 2.5° C./min and kept for 2 h, then heated to 900° C. at a heating rate of 2° C./min and kept for 1 h, and then cooled naturally. Metal (Ni)/carbon material was obtained and taken out. It was named as glucose-metal (Ni)/N doped-carbon catalyst, and was denoted as NiC10#.

Example 16 Preparation of the Graphene Material Inlaid with Single Metal Atoms Sample NiC11#

24 g tripolycyanamide, 4.5 g glycine and 0.4 g nickel acetate were put in a ball mill tank and then ball milled on a ball mill, wherein the ball milling rotate speed was 100 rpm/min and the ball milling time was 2 h, and the catalytic material precursor was obtained after fully mixing. The precursor was transferred into a zirconia boat, then put into a tube furnace, and Ar gas was passed through at a flow rate of 25 mL/min. Subsequently, it was heated to 900° C. at a heating rate of 2.5° C./min and kept for 1 h, and then cooled naturally. Metal (Ni)/carbon material was obtained and taken out. It was named as one step pyrolysis-metal (Ni)/carbon-N doped-optimized catalyst and was denoted as sample NiC11#.

Example 17 Preparation of the Gas Diffusion Electrode (Carbon Paper)

10 mg graphene material inlaid with single metal atoms was dispersed into a mixed solution of 480 μL ultrapure water and 480 μL of isopropanol, then 40 μL of 5 wt % Nafion solution was added and the mixture was uniformly mixed by ultrasonic. 100 μL of the mixed solution obtained was coated onto a carbon paper and then vacuum dried at 60° C. for 2 h to obtain a carbon paper that was loaded with the catalytic material for electroreducing $CO_2$, wherein the size of the carbon paper was 1 cm×1 cm and the weight of the catalytic material for electroreducing $CO_2$ loaded thereon was 1 mg. The catalytic gas diffusion electrode for the electroreduction of $CO_2$ was prepared and the loading dosage was 1 mg/cm².

The graphene material inlaid with single metal atoms samples NiC1#~NiC11#, FeC1#~FeC7# and CoC1#~CoC7# were respectively used, and the gas diffusion electrodes prepared were correspondingly denoted as E1-NiC1#~E1-NiC11#, E1-FeC1#~E1FeC7# and E1-CoC1#~E1-CoC7#.

Example 18 Preparation of the Gas Diffusion Electrode (Carbon Cloth)

10 mg graphene material inlaid with single metal atoms was dispersed into a mixed solution of 480 μL ultrapure water and 480 μL of isopropanol, then 40 μL of 5 wt % Nafion solution was added and the mixture was uniformly mixed by ultrasonic. 100 μL of the mixed solution obtained was coated onto a carbon cloth and then vacuum dried at 60° C. for 2 h to obtain a carbon cloth that was loaded with the catalytic material for electroreducing $CO_2$, wherein the size of the carbon cloth was 1 cm×1 cm and the weight of the catalytic material for electroreducing $CO_2$ loaded thereon was 1 mg. The catalytic gas diffusion electrode for the electroreduction of $CO_2$ was prepared and the loading dosage was 1 mg/cm².

The graphene material inlaid with single metal atoms samples NiC1#~NiC11#, FeC1#~FeC7# and CoC1#~CoC7# were respectively used, and the gas diffusion electrodes prepared were correspondingly denoted as E2-NiC1#~E2-NiC11#, E2-FeC1#~E2-FeC7# and E2-CoC1#~E1-CoC7#.

Example 19 Preparation of the Gas Diffusion Electrode (Carbon Paper)

10 mg graphene material inlaid with single metal atoms was dispersed into a mixed solution of 480 μL ultrapure water and 480 μL of isopropanol, then 40 μL of 5 wt % Nafion solution was added and the mixture was uniformly mixed by ultrasonic. 50 μL of the mixed solution obtained was coated onto a carbon paper and then vacuum dried at 60° C. for 2 h to obtain a carbon paper that was loaded with the catalytic material for electroreducing $CO_2$, wherein the size of the carbon paper was 1 cm×1 cm and the weight of the catalytic material for electroreducing $CO_2$ loaded thereon was 0.5 mg. The catalytic gas diffusion electrode for the electroreduction of $CO_2$ was prepared and the loading dosage was 0.5 mg/cm².

The graphene material inlaid with single metal atoms samples NiC1#~NiC11#, FeC1#~FeC7# and CoC1#~CoC7# were respectively used, and the gas diffusion electrodes prepared were correspondingly denoted as E3-NiC1#~E3-NiC11#, E3-FeC1#~E3-FeC7# and E3-CoC1#~E1-CoC7#.

Example 20 Preparation of the Electrode (Glassy Carbon Electrode)

5 mg graphene material inlaid with single metal atoms was dispersed into a mixed solution of 490 μL ultrapure water and 490 μL isopropanol, then 20 μL of 5 wt % Nafion solution was added and the mixture was uniformly mixed by ultrasonic. 4 μL of the mixed solution obtained was dripped onto the surface of a glassy carbon electrode, and after being naturally dried, it was baked at 80° C. for 5 min to obtain a glassy carbon electrode loaded with the catalytic material for electroreducing $CO_2$ (model AFE3T050GCPK (Pine Research Instrumentation), diameter is 5 mm). The catalytic gas electrode for the electroreduction of $CO_2$ was prepared and the loading dosage was 0.1 mg/cm².

The graphene material inlaid with single metal atoms samples NiC1#~NiC11#, FeC1#~FeC7# and CoC1#~CoC7# were respectively used, and the gas diffusion electrodes prepared were correspondingly denoted as E4-NiC1#~E4-NiC11#, E4-FeC1#~E4-FeC7# and E4-CoC1#~E1-CoC7#.

Example 21 Preparation of the Gas Diffusion Electrode (Carbon Paper)

10 mg graphene material inlaid with single metal atoms was dispersed into a mixed solution of 480 μL ultrapure water and 480 μL of isopropanol, then 40 μL of 5 wt % Nafion solution was added and the mixture was uniformly mixed by ultrasonic. 40 μL of the mixed solution obtained was coated onto a carbon paper and then vacuum dried at 60° C. for 2 h to obtain a carbon paper that was loaded with the catalytic material for electroreducing $CO_2$, wherein the size of the carbon paper was 1 cm×1 cm and the weight of the catalytic material for electroreducing $CO_2$ loaded thereon was 0.4 mg. The catalytic gas diffusion electrode for the electroreduction of $CO_2$ was prepared and the loading dosage was 0.4 mg/cm².

The graphene material inlaid with single metal atoms samples NiC1#~NiC11#, FeC1#~FeC7# and CoC1#~CoC7# were respectively used, and the gas diffusion electrodes prepared were correspondingly denoted as E5-NiC1#~E5-NiC11#, E5-FeC1#~E5-FeC7# and E5-CoC1#~E1-CoC7#.

Example 22 Characterization of the Samples

Scanning electron microscopy, atomic force microscopy, transmission electron microscopy, high resolution transmission electron microscopy, high angle annular dark field-scanning transmission electron microscopy, X-ray diffraction, X-ray photoelectron spectroscopy, near edge X-ray absorption of the K absorption edge and the Fourier transformation spectra of the corresponding extended edge were used for the characterization of the samples NiC1#~NiC7#, FeC1#~FeC7# and CoC1#~CoC7#. The results thereof show that graphene-like structure is exhibited in all of the samples NiC1#~NiC7#, FeC1#~FeC7# and CoC1#~CoC7#, and there are single metal atoms existing in each of the samples. In the acid pickled samples NiC2#, NiC3#, NiC5#, NiC6# and NiC7#, metallic Ni was dispersed uniformly in the form of single atoms and inlaid in the framework of the graphene material, and had a very high density. While in the samples NiC1#, NiC4# and NiC8#~NiC11# which did not experience the acid pickling, metallic particles were also included in addition to the metallic Ni atoms. In samples FeC1#~FeC7# and CoC1#~CoC7#, in addition to the metallic Fe atoms and metallic Co atoms, Fe carbides and Co carbides with a particle size of 1~2 nm were also comprised respectively.

In samples NiC2#, NiC3#, NiC5#, NiC6# and NiC7#, the mass percentage of the metallic Ni atoms in the graphene material inlaid with single metal atoms was between 1% and 10%; and in samples NiC2# and NiC3#, the mass percentage of the single metal atoms existing in the graphene material inlaid with single metal atoms was between 2.5% and 4%.

In the samples NiC1#, NiC4# and NiC8#~NiC11# which did not experience the acid pickling, the mass percentage of the metallic Ni atoms in the graphene material inlaid with single metal atoms was between 1% and 5%, and the molar ratio of the Ni existing in the metallic particles to the single atoms Ni was between 1:0.1 and 1:1. In the samples FeC1#~FeC7#, the mass percentage of the metallic Fe atoms in the graphene material inlaid with single metal atoms was between 1% and 10%, and the molar ratio of the Fe existing in the Fe carbides to the single atoms Fe was between 1:0.1 and 1:0.5. In the samples CoC1#~CoC7#, the mass percentage of the metallic Co atoms in the graphene material inlaid with single metal atoms was between 1% and 10%, and the molar ratio of the Co existing in the Co carbides to the single atoms Co was between 1:0.1 and 1:0.5.

As typical representations, the testing results of the samples NiC2# and NiC3# are shown in FIG. 2 to FIG. 9.

Figure 2:
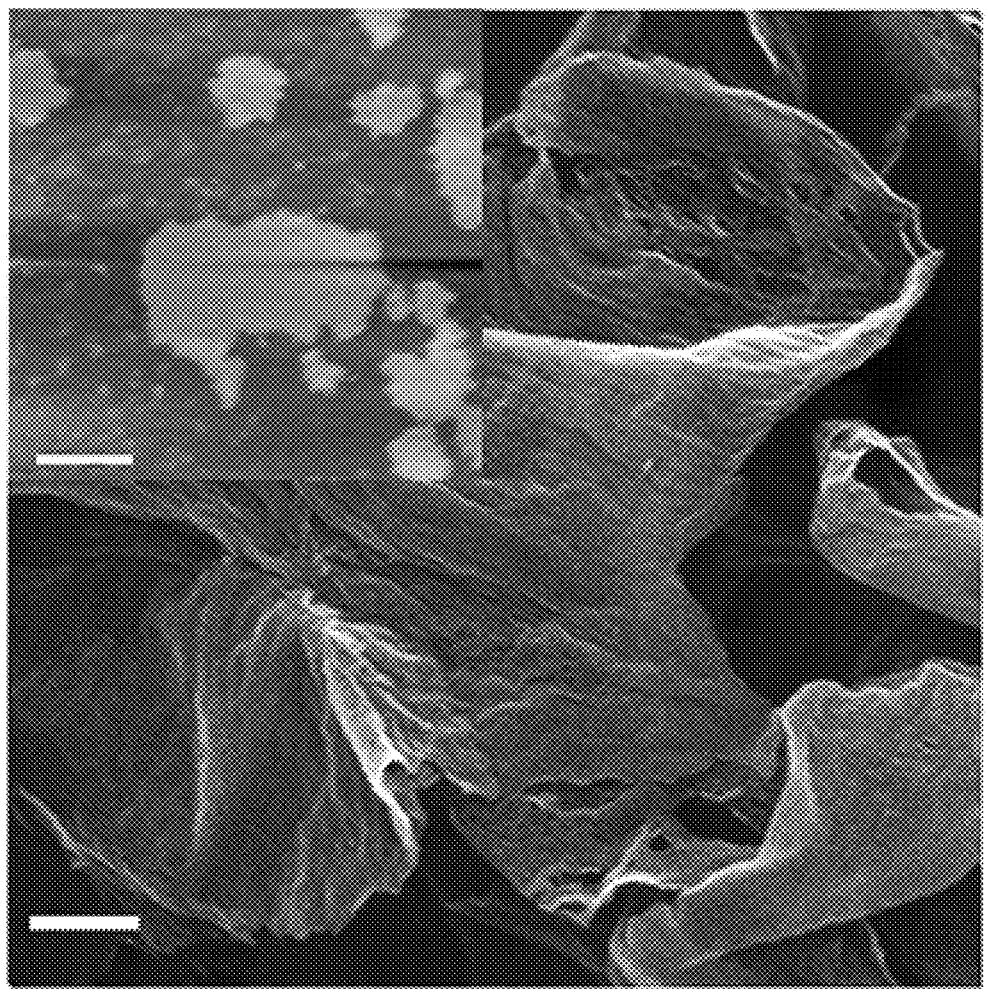
FIG. 2 are scanning electron microscopy and atomic force microscopy photographs of the graphene material inlaid with single metal atoms sample NiC3[#], wherein the interpolating figure is the atomic force microscopy photograph; the scaleplate of the scanning electron microscopy photograph is 100 nm and the scaleplate of the atomic force microscopy photograph is 500 nm.

FIG. 2 are scanning electron microscopy (SEM) and atomic force microscopy (AFM) (the interpolating figure) photographs of the graphene material inlaid with single metal atoms sample NiC3#, wherein the scaleplates are 100 nm and 500 nm, respectively. It can be seen from the figure that sample NiC3# shows a structure similar to graphene, and the thickness thereof is 0.7 nm.

Figure 3:
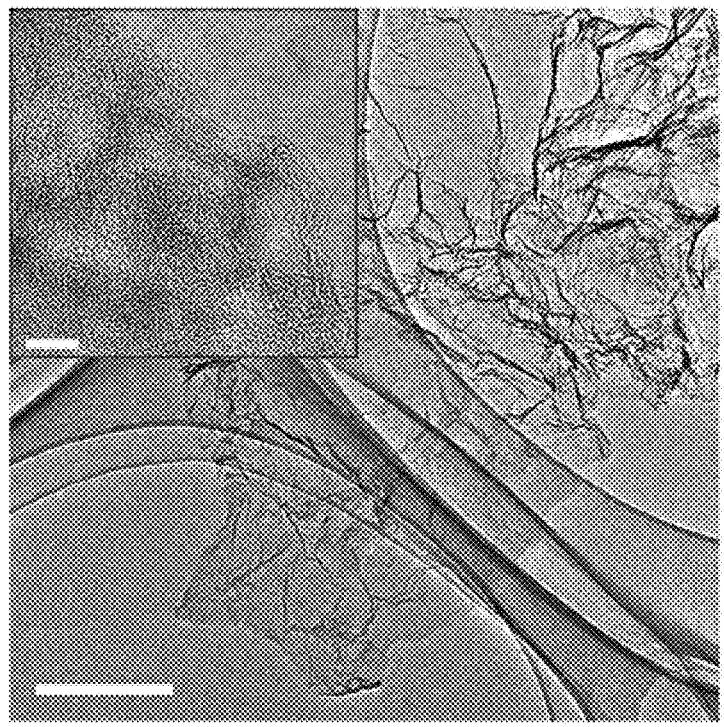
FIG. 3 are transmission electron microscopy and high resolution transmission electron microscopy photographs of the graphene material inlaid with single metal atoms sample NiC3[#], wherein the interpolating figure is the high resolution transmission electron microscopy photograph; the scaleplate of the transmission electron microscopy photograph is 200 nm and the scaleplate of the high resolution transmission electron microscopy photograph is 10 nm.

FIG. 3 are transmission electron microscopy(TEM) and high resolution transmission electron microscopy(HRTEM) (the interpolating figure) photographs of the graphene material inlaid with single metal atoms sample NiC3#, wherein the scaleplates thereof are respectively 200 nm and 10 nm. It can be seen from the figure that sample NiC3# has a structure similar to graphene. No metallic particles are observed in both the low resolution and high resolution transmission electron microscopy photographs, and the metal atoms thereof are uniformly dispersed on the graphene.

Figure 4:
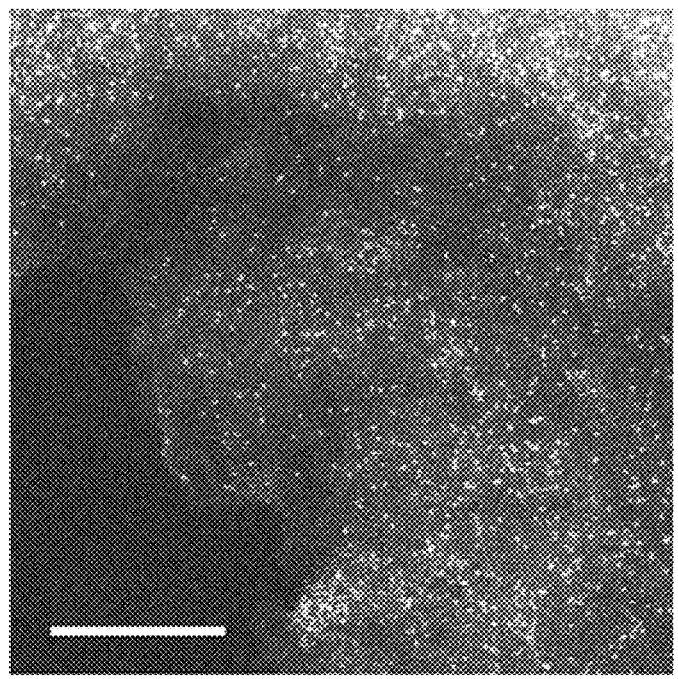
FIG. 4 is a high angle annular dark field-scanning transmission electron microscopy(HAADF-STEM) photograph of the graphene material inlaid with single metal atoms sample NiC3[#], wherein the scaleplate is 5 nm.

FIG. 4 is a high angle annular dark field-scanning transmission electron microscopy (HAADF-STEM) photograph of the graphene material inlaid with single metal atoms sample NiC3#, wherein the scaleplate is 5 nm. It can be seen from the figure that Ni atom in sample NiC3# is inlaid in the framework of the graphene material in the form of single atoms and has a very high density.

Figure 5:
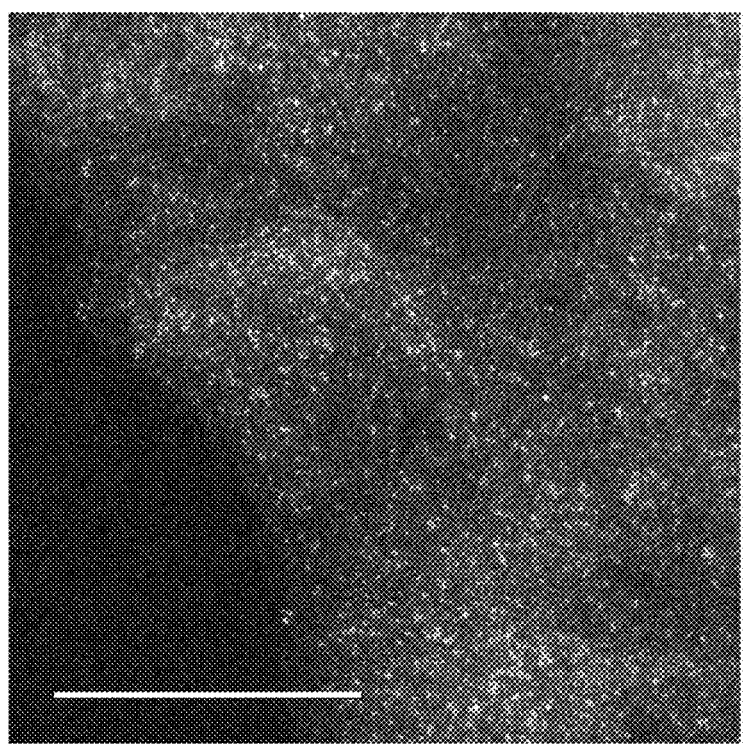
FIG. 5 is a HAADF-STEM photograph of the graphene material inlaid with single metal atoms sample NiC2[#], wherein the scaleplate is 10 nm.

FIG. 5 is a HAADF-STEM photograph of the graphene material inlaid with single metal atoms sample NiC2#, wherein the scaleplate is 10 nm. It can be seen from the figure that Ni atom in sample NiC2# is in a similar state to that in sample NiC3#, which is also inlaid in the framework of the graphene material in the form of single atoms and has a very high density.

Figure 6:
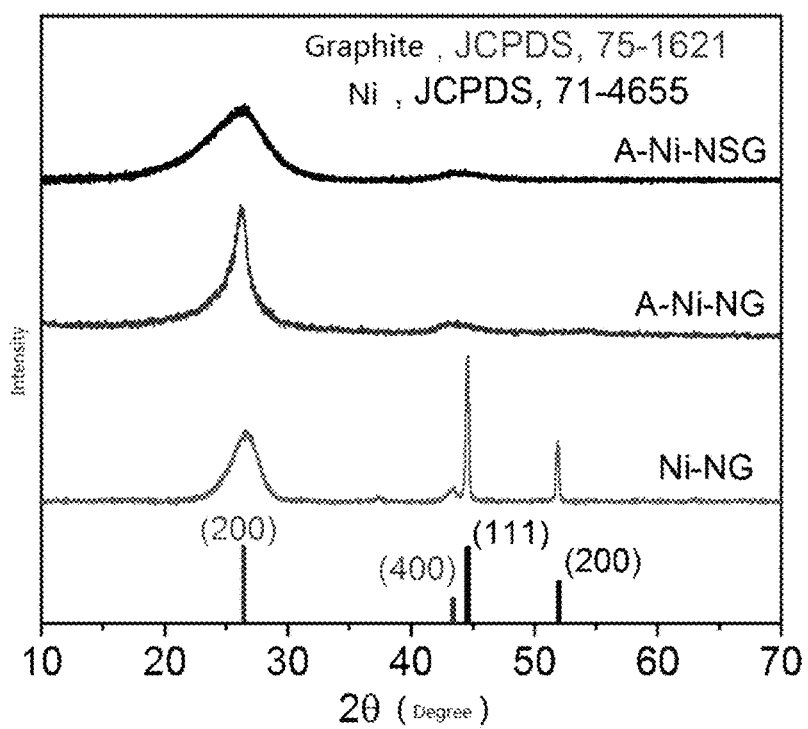
FIG. 6 are X-ray diffraction (XRD) spectra of the graphene material inlaid with single metal atoms samples NiC2[#] and NiC3[#].

FIG. 6 are X-ray diffraction (XRD) spectra of the graphene material inlaid with single metal atoms samples NiC2# and NiC3#; wherein NiPc represents nickel phthalocyanine, Ni-NG represents N doped graphene with Ni loaded sample, A-Ni-NG represents sample NiC3# and A-Ni-NSG represents sample NiC2#. It can be seen from the figure that, there are no phases of metallic Ni particles or Ni related compounds existing in sample NiC2# and NiC3#.

Figure 7:
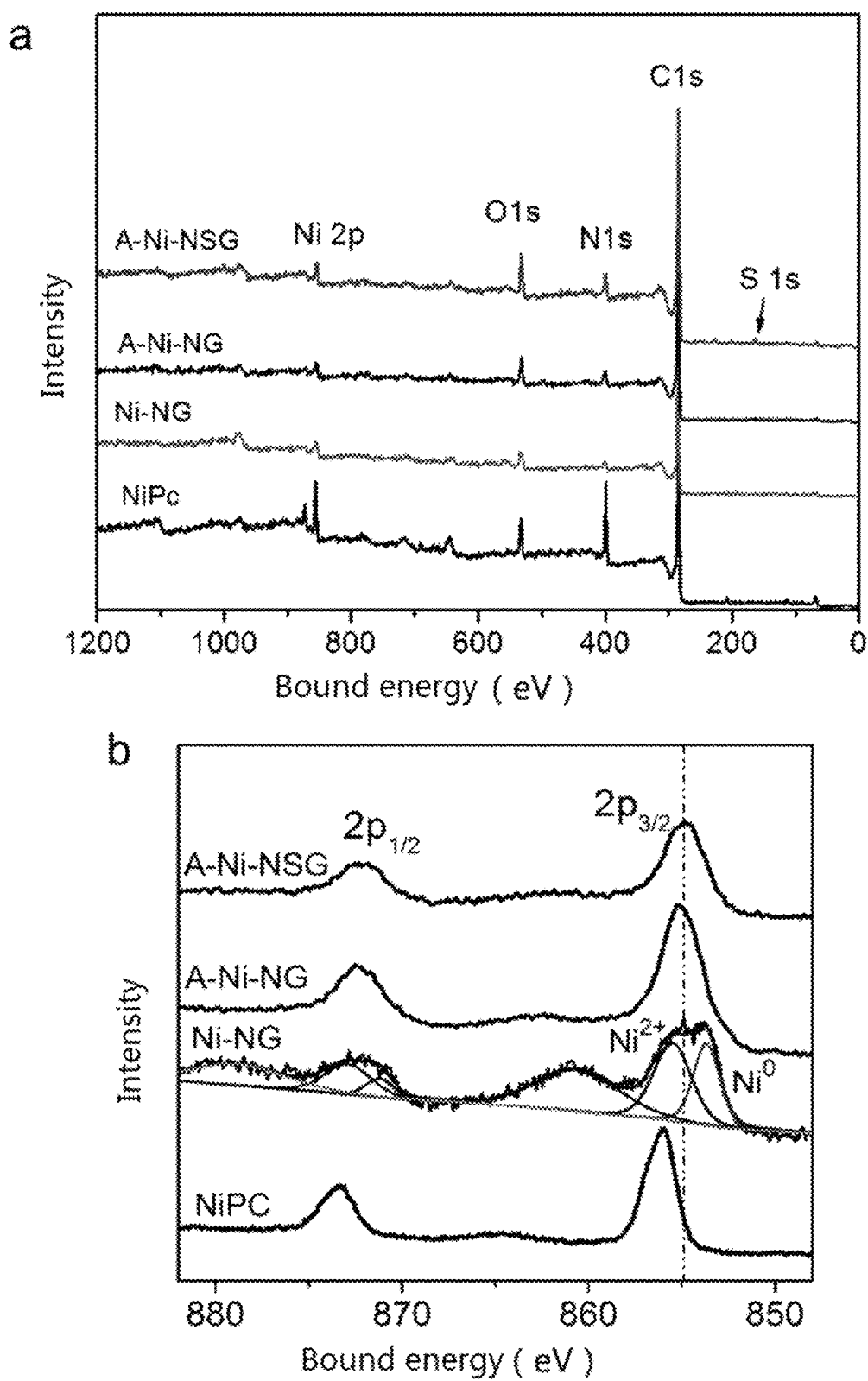
FIG. 7 is the comparison of the X-ray photoelectron spectroscopy spectra and high resolution Ni2p XPS spectra of the graphene material inlaid with single metal atoms samples NiC2[#] and NiC3[#] and N doped graphene with Ni loaded sample; wherein (a) are X-ray photoelectron spectroscopy spectra and (b) are high resolution Ni2p XPS spectra.

FIG. 7 is the comparison of the X-ray photoelectron spectroscopy spectra and high resolution Ni2p XPS spectra of the graphene material inlaid with single metal atoms samples NiC2# and NiC3# with N doped graphene and N doped graphene with Ni loaded samples; wherein (a) are X-ray photoelectron spectroscopy spectra and (b) are high resolution Ni2p XPS spectra. In the figure, NiPc represents nickel phthalocyanine, Ni-NG represents N doped graphene with Ni loaded sample, A-Ni-NG represents sample NiC3# and A-Ni-NSG represents sample NiC2#. It can be calculated from the XPS data that, in sample NiC2# and sample NiC3#, the mass proportions of the Ni element in the materials are respectively about 4% and 2.5%, and the doping dosages of N are respectively about 8.4% and 9.2%. Valence electron state of the Ni atom is between 0 and +2.

Figure 8:
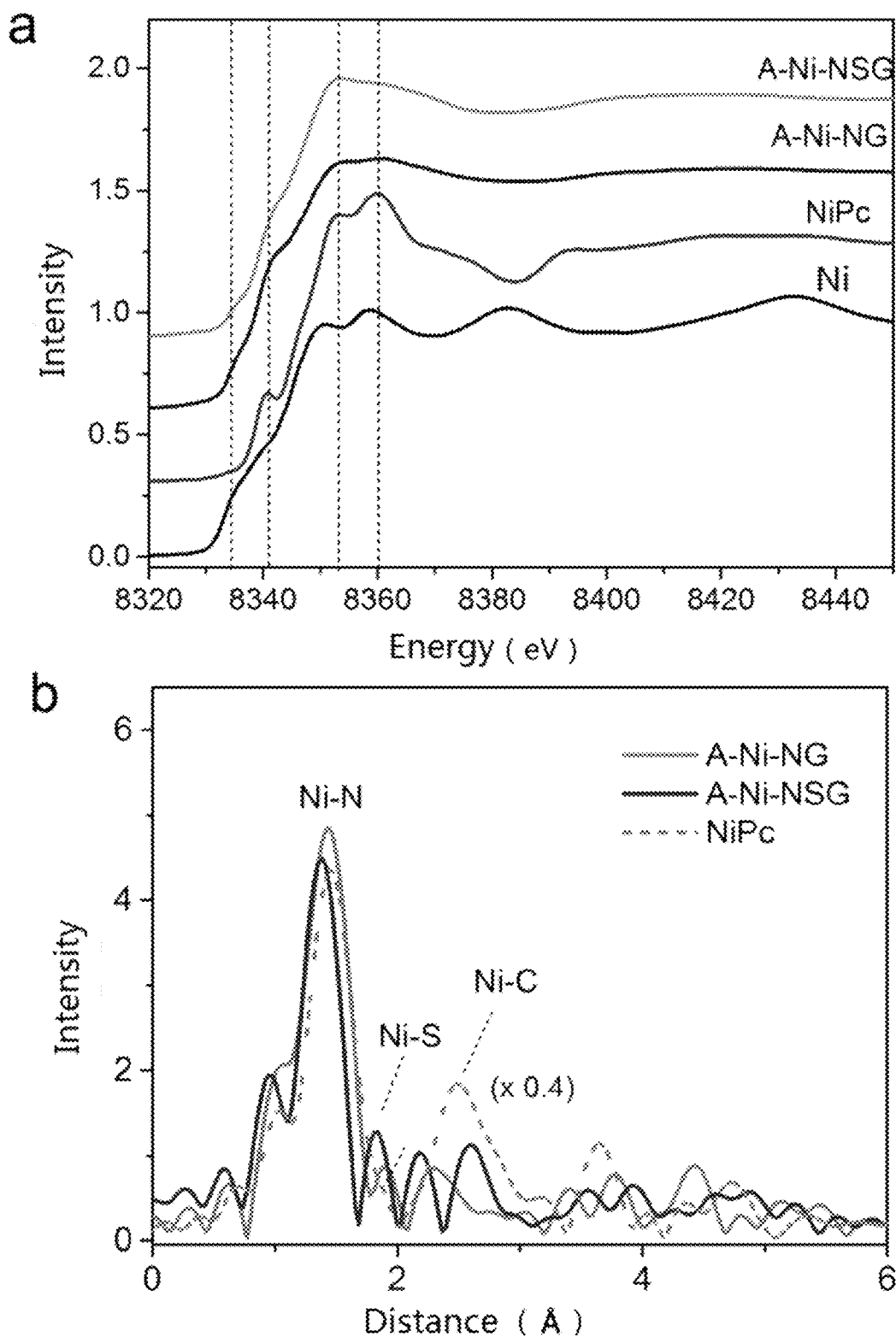
FIG. 8 are X-ray absorption near edge spectra of the K absorption edge and the Fourier transformation spectra of the corresponding extended edge of the Ni atoms in the graphene material inlaid with single metal atoms samples NiC2[#] and NiC3[#]; wherein (a) are the near edge X-ray absorption spectra and (b) are the Fourier transformation spectra of the corresponding extended edge.

FIG. 8 are X-ray absorption near edge spectra (XANES) of the K absorption edge and the Fourier transformation spectra (Fourier-transformation of the EXAFS) of the corresponding extended edge of the Ni atoms in the graphene material inlaid with single metal atoms samples NiC2# and NiC3#; wherein (a) are X-ray photoelectron spectroscopy spectra and (b) are high resolution Ni2p XPS spectra. In the figure, NiPc represents nickel phthalocyanine, A-Ni-NG represents sample NiC3# and A-Ni-NSG represents sample NiC2#. Energy positions of the K absorption edge of Ni atoms in samples NiC2# and NiC3# also confirm the data of XPS Ni 2p, and valence electron state of the Ni atom is between 0 and +2. In the Fourier transformation spectra of the extended edge in FIG. 8(b), no interaction between Ni—Ni atoms in NiC2# and NiC3# is observed, while only the interactions between Ni atoms and N atoms as well as Ni atoms and S atoms can be observed, which further proves that the graphene material inlaid with single metal atoms provided by the present invention is a Ni single atoms inlaid N doped graphene catalyst with high density.

Figure 9:
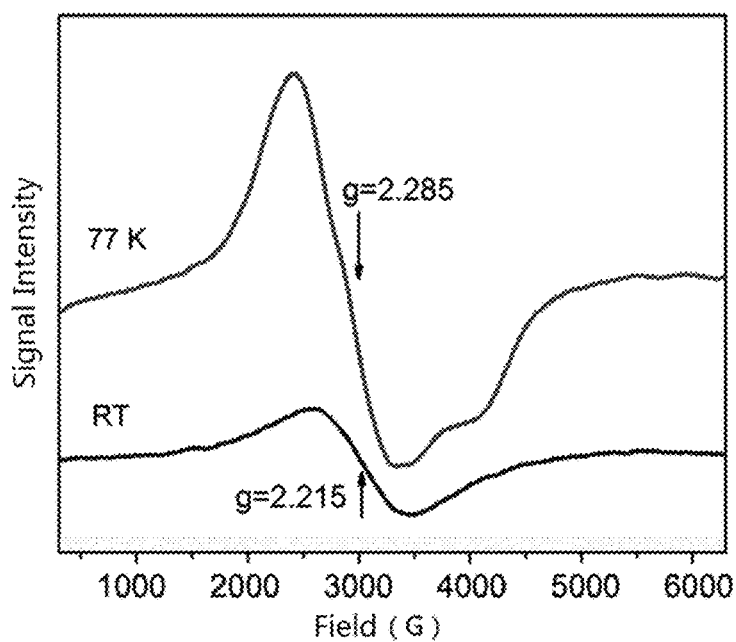
FIG. 9 are electron paramagnetic resonance spectra of the graphene material inlaid with single metal atoms samples NiC2[#] and NiC3[#].

FIG. 9 are electron paramagnetic resonance (EPR) spectra of the graphene material inlaid with single metal atoms samples NiC2# and NiC3#. It can be seen from the figure that the signals come from the lone electrons of the valence electrons of the Ni atoms in samples NiC2# and NiC3#.

Example 23 Characterization of the Samples and Measurement of the Catalytic Properties for Preparing CO from the Electroreduction of $CO_2$ Measurement of the catalytic properties of the samples NiC1#~NiC7# for preparing CO from the electroreduction of $CO_2$ were conducted respectively, wherein cyclic sweep voltammetry diagrams in the electrolytes when passed through with Ar and $CO_2$ were taken. The testing conditions thereof included: using 0.5M $KHCO_3$ (pH=7.3) as the electrolyte, 1 atm of $CO_2$ and room temperature.

Figure 10:
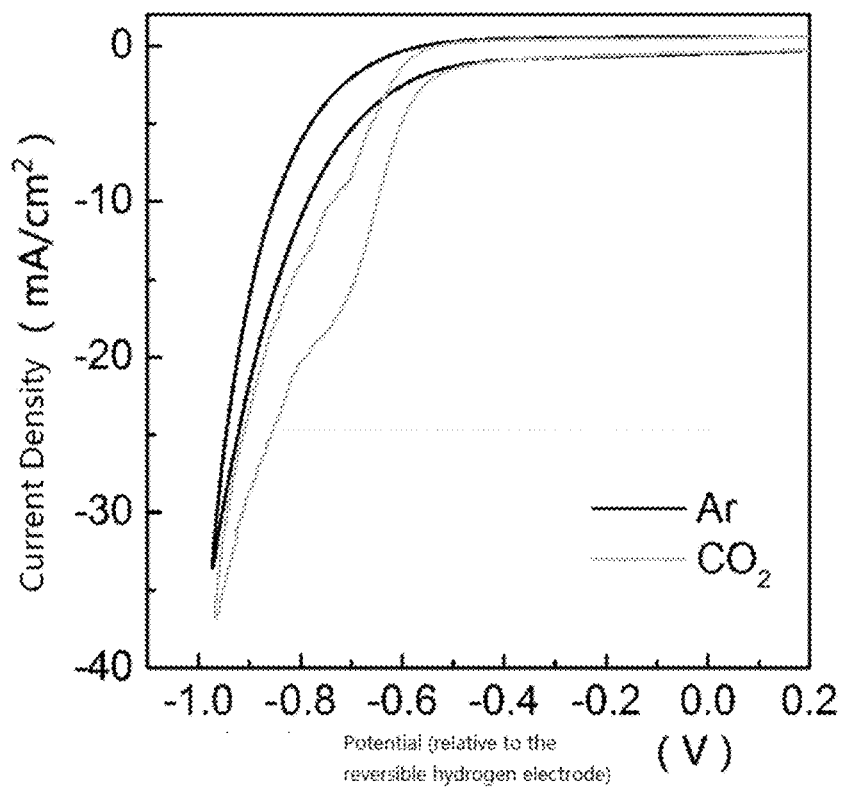
FIG. 10 are cyclic sweep voltammetry diagrams of the graphene material inlaid with single metal atoms sample NiC2[#] in electrolyte when respectively passed through with Ar and $CO_2$.
Figure 11:
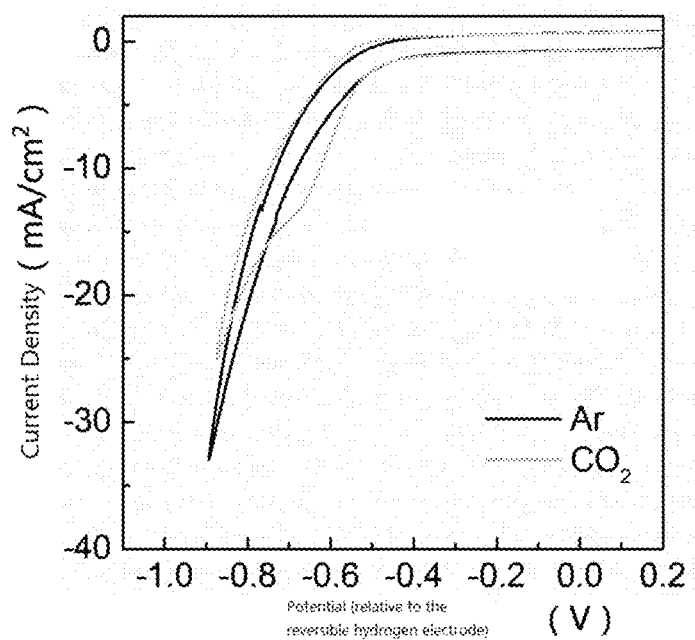
FIG. 11 are cyclic sweep voltammetry diagrams of the graphene material inlaid with single metal atoms sample NiC3[#] in electrolyte when respectively passed through with Ar and $CO_2$.

As typical representations, the testing results of the samples NiC2# and NiC3# are shown in FIG. 10 to FIG. 11, respectively. It can be seen from the figures that, significant reduction peaks appear around electric potential of −0.7V (vs.RHE) in the figures of both samples NiC2# and NiC3# when $CO_2$ was passed through the electrolytes. Testing results of the other samples are similar to samples NiC2# and NiC3#, which indicates that the graphene material inlaid with single metal atoms provided by the present application has a good reductive catalytic ability for $CO_2$.

Example 24 Linear Sweep Voltammetry Test

Linear sweep voltammetry test was conducted on gas diffusion electrodes E4-NiC1#~E4-NiC7# respectively.

The apparatus employed was electrochemical workstation CHI660e produced by Shanghai ChenHua company. The testing conditions thereof included: the loading dosage of the catalytic material on the glassy carbon electrode was 0.1 mg/cm², 0.5M $KHCO_3$ (pH=7.3) was used as the electrolyte, 1 atm of $CO_2$ and room temperature.

The result shows that, the graphene material inlaid with single metal atoms of the present application has a significantly better reductive activity for $CO_2$ than the reference materials N-G and Ni-NG.

Figure 12:
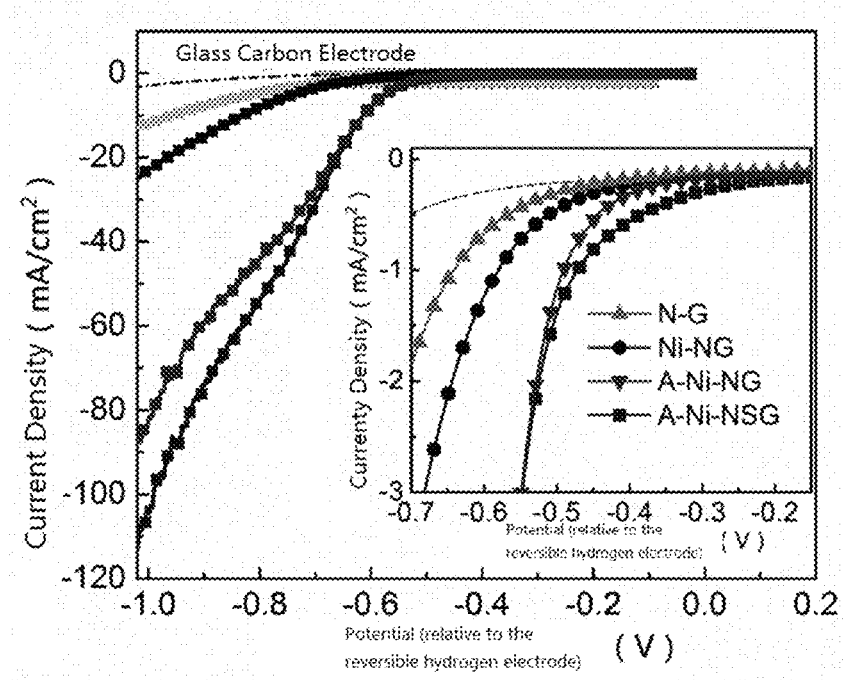
FIG. 12 is the comparison of the linear sweep voltammetry (LSV) diagrams of the graphene material inlaid with single metal atoms samples NiC2[#] and NiC3[#] with N doped graphene and N doped graphene with Ni loaded samples.

As typical representations, linear sweep voltammetry diagrams of the samples NiC2# and NiC3# are shown in FIG. 12. In the figure, N-G represents N doped graphene, Ni-NG represents N doped graphene with Ni loaded, A-Ni-NG represents NiC3# (corresponding to the testing result of electrode E4-NiC3#), and A-Ni-NSG represents NiC2# (corresponding to the testing result of electrode E4-NiC2#). It can be seen from the figure that, when bias voltage is −1.0V (vs. RHE), reduction current generated by NiC2# is ~1000 mA/mg$_{(catalyst)}$, and current at unit area reaches 100 mA/cm².

Example 25 Faradic Efficiency Test of the Gas Diffusion Electrode

Faradic efficiency tests under different electric potentials were conducted on gas diffusion electrodes E5-NiC1#~E5-NiC7# respectively. The apparatus employed were electrochemical workstation CHI660e and Agilent's gas chromatograph 7890, and the device used for testing was proton membrane (perfluorinated sulfonic acid resin Nafion® 117) separated H type electrochemical reactor. The testing conditions included: H type electrochemical reactor, $CO_2$ reaction chamber with a volume of 100 mL, 0.5M $KHCO_3$ (pH=7.3) was used as the electrolyte, 1 atm of $CO_2$, room temperature, the flow rate of $CO_2$ was 10 cc./min, the area of the electrode was 1 cm² and the loading dosage of the catalytic material on the gas diffusion electrode was 0.4 mg/cm².

The result shows that, the graphene material inlaid with single metal atoms provided by the present application has a very good selectivity on the electrochemical reduction of $CO_2$, and effectively inhibits the generation of hydrogen. In a large recovery voltage region from −0.5 to −1.0 V (vs. RHE), the catalyst has a Faradic efficiency of over 90% for the reduction of $CO_2$ to CO (the catalyst has the highest selectivity of nearly 97% when the recovery voltage is −0.5V (vs.RHE)).

Figure 13:
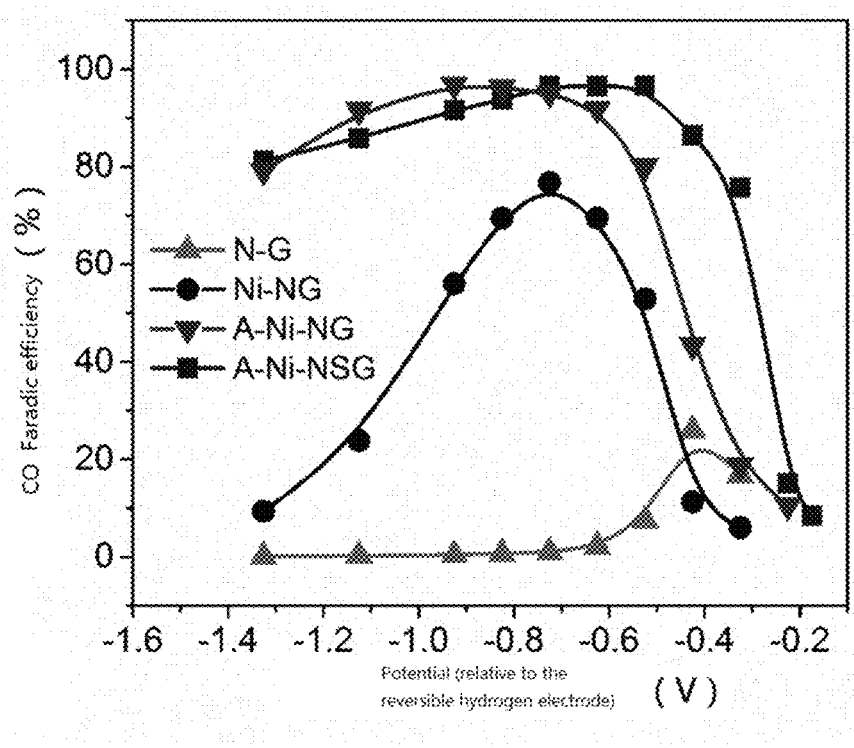
FIG. 13 is the comparison of the CO Faradic efficiencies of the graphene material inlaid with single metal atoms samples NiC2[#] and NiC3[#] and N doped graphene and N doped graphene with Ni loaded samples under different electric potentials.

The comparison of the CO Faradic efficiencies under different electric potentials of the typical samples $NiC2^{\#}$ (corresponding to the test result of electrode $E5-NiC3^{\#}$) and $NiC3^{\#}$ (corresponding to the test result of electrode $E5-NiC3^{\#}$) with N doped graphen and N doped graphene with Ni loaded samples is shown in FIG. 13.

Example 26 Stability Test

Stability tests were conducted on the graphene material inlaid with single metal atoms on gas diffusion electrodes $E5-NiC1^{\#}$~$E5-NiC7^{\#}$ respectively. The device used for testing was proton membrane (perfluorinated sulfonic acid resin Nafion® 117) separated H type electrochemical reactor. The testing conditions included: H type electrochemical reactor, $CO_2$ reaction chamber with a volume of 100 mL, 0.5M $KHCO_3$ (pH=7.3) was used as the electrolyte, 1 atm of $CO_2$, room temperature, the flow rate of $CO_2$ was 10 cc./min, the area of the electrode was 1 $cm^2$, the loading dosage of the catalytic material on the gas diffusion electrode was 0.4 $mg/cm^2$ and the bias voltage of the gas diffusion electrodes was −0.72V (vs. RHE).

The result shows that, the graphene material inlaid with single metal atoms of the present application has a very good stability, and during the 100 hours stability test, $CO_2$ reduction current and the selectivity for the generation of CO show no obvious changes.

Figure 14:
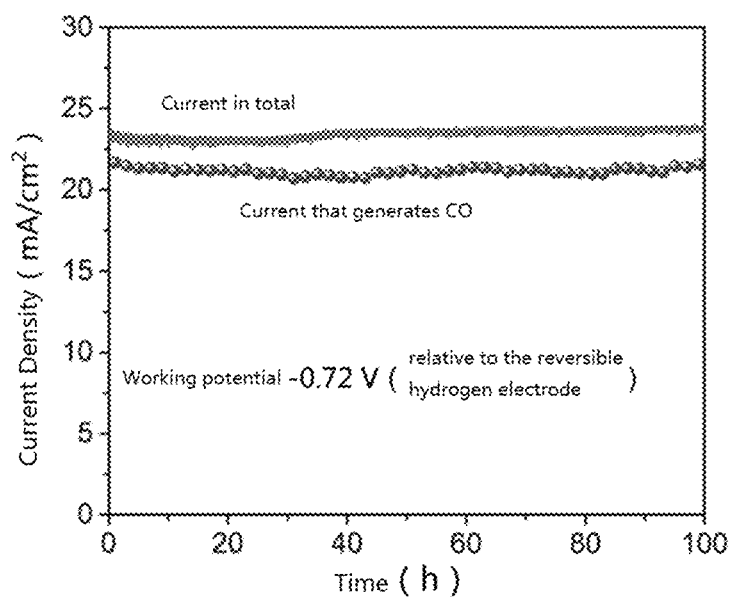
FIG. 14 is the stability test result of the graphene material inlaid with single metal atoms sample NiC3[#].

The stability test result of the typical sample $NiC3^{\#}$ (corresponding to the test result of electrode $E5-NiC3^{\#}$) is shown in FIG. 14.

Figure 15:
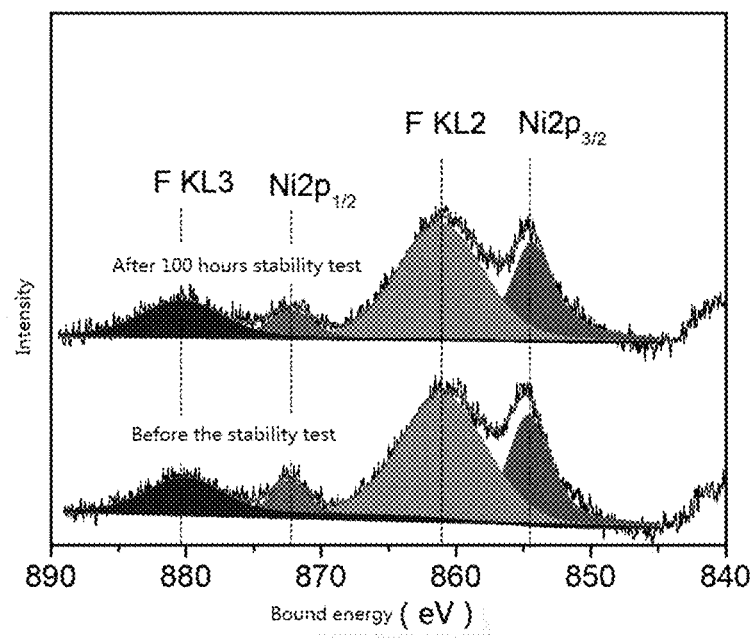
FIG. 15 are Ni2p XPS spectra of the Ni atom in the graphene material inlaid with single metal atoms sample NiC3[#] before and after a 100 hours stability test.

FIG. 15 are the Ni2p XPS spectra of Ni atoms from sample $NiC3^{\#}$ (corresponding to electrode $E5-NiC3^{\#}$) before and after the 100 hours stability test. It can be seen from the figure that the Ni atoms have the same chemical state before and after the reaction. It is indicated that the single atoms catalyst has excellent structural and property stabilities.

Example 27

Linear sweep voltammetry (LSV) test and Faradic efficiency test under different electric potentials were conducted on sample $NiC8^{\#}$.

The LSV testing conditions included: the loading dosage of the catalytic material on the glassy carbon electrode was 0.1 $mg/cm^2$ (the employed electrode was $E4-NiC8^{\#}$), 0.5M $KHCO_3$ (pH=7.3) was used as the electrolyte, 1 atm of $CO_2$ and room temperature.

The device used for the Faradic efficiency test was proton membrane (perfluorinated sulfonic acid resin Nafion® 117) separated H type electrochemical reactor. The testing conditions included: H type electrochemical reactor, $CO_2$ reaction chamber with a volume of 100 mL, 0.5M $KHCO_3$ (pH=7.3) was used as the electrolyte, 1 atm of $CO_2$, room temperature, the flow rate of $CO_2$ was 10 cc./min, the area of the electrode was 1 $cm^2$, and the loading dosage of the catalytic material on the gas diffusion electrode was 0.5 $mg/cm^2$ (the employed electrode was $E3-NiC8^{\#}$).

Figure 16:
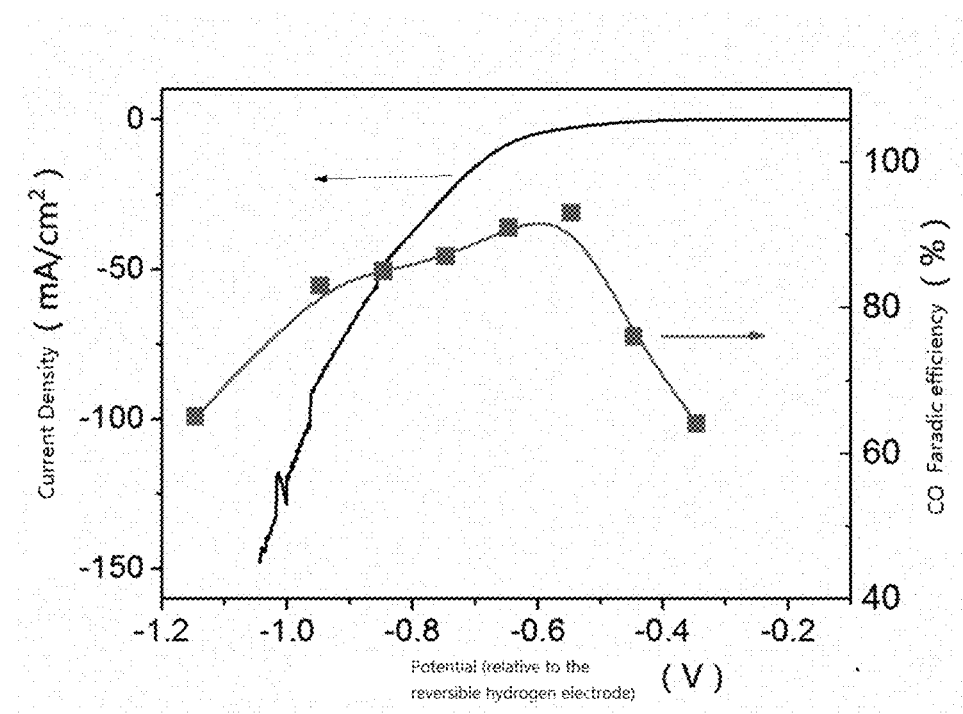
FIG. 16 are linear sweep voltammetry (LSV) diagram of the graphene material inlaid with single metal atoms sample NiC8[#], and the Faradic efficiencies thereof under different electric potentials.

The result is shown in FIG. 16. It can be seen from the figure that, the graphene material inlaid with single metal atoms prepared from the precursor comprising conductive carbon material has a very good catalytic activity for $CO_2$, and when the bias voltage is in the region of −0.6 to −0.9 V (vs. RHE), the Faradic efficiency of the CO generation is over 80%. Nevertheless, the electric potential region of high CO Faradic efficiency is merely 0.3V, which is relatively narrow, and when the reduction potential increases, the CO Faradic efficiency lowers down significantly. As for the reduction current, at −1.0V, the density of the current at unit area reaches 120 $mA/cm^2$.

Example 28

Linear sweep voltammetry test and Faradic efficiency test under different electric potentials were conducted on samples $CoC1^{\#}$~$CoC7^{\#}$ respectively.

The LSV testing conditions included: the loading dosage of the catalytic material on the glassy carbon electrode was 0.1 $mg/cm^2$ (the employed electrodes were respectively $E4-CoC1^{\#}$~$E4-CoC7^{\#}$), 0.5M $KHCO_3$ (pH=7.3) was used as the electrolyte, 1 atm of $CO_2$ and room temperature.

The device used for the Faradic efficiency test was proton membrane (perfluorinated sulfonic acid resin Nafion® 117) separated H type electrochemical reactor. The testing conditions included: H type electrochemical reactor, $CO_2$ reaction chamber with a volume of 100 mL, 0.5M $KHCO_3$ (pH=7.3) was used as the electrolyte, 1 atm of $CO_2$, room temperature, the flow rate of $CO_2$ was 10 cc./min, the area of the electrode was 1 $cm^2$, and the loading dosage of the catalytic material on the gas diffusion electrode was 0.5 $mg/cm^2$ (the employed electrodes were respectively $E3-CoC1^{\#}$~$E3-CoC7^{\#}$).

The result shows that, the reduction currents of samples $CoC1^{\#}$~$Co-C7^{\#}$ are relatively low and the selectivity for $CO_2$ thereof is very bad. The Faradic efficiency of CO generation is very low within the whole region of the electric potential, and the major contribution for the reduction current comes from the generation of hydrogen.

Figure 17:
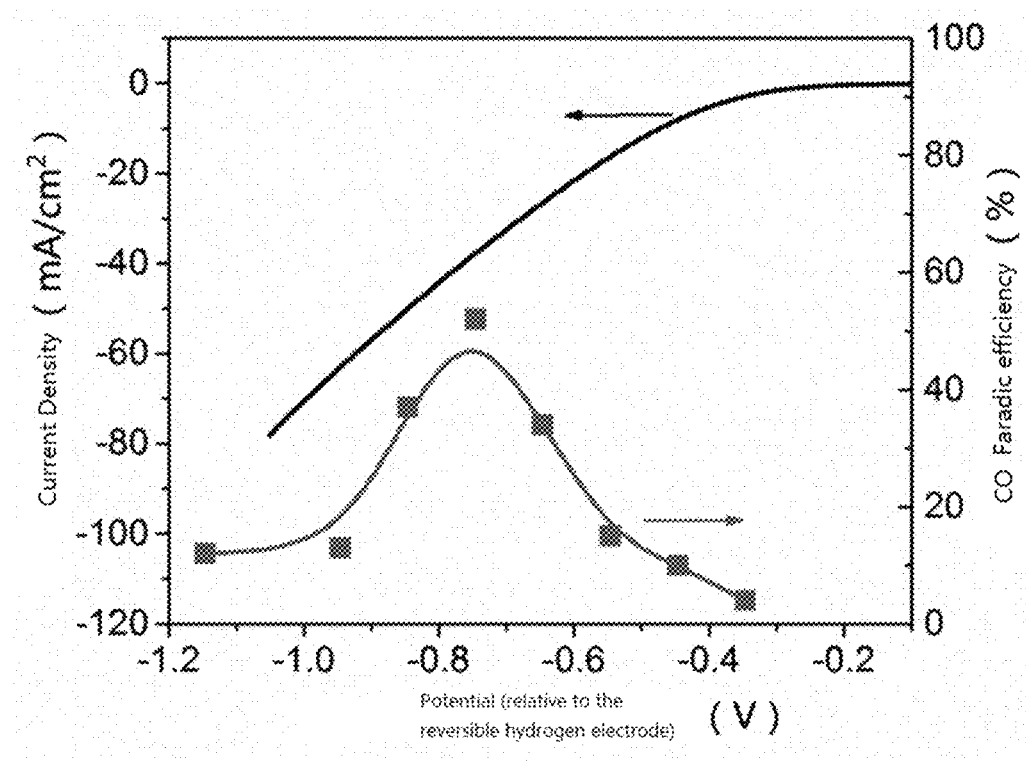
FIG. 17 are linear sweep voltammetry diagram of the graphene material inlaid with single metal atoms sample CoC3[#], and the Faradic efficiencies thereof under different electric potentials.

The results of the linear sweep voltammetry test and the Faradic efficiency test under different electric potentials of the typical sample $CoC3^{\#}$ (corresponding to the test result of electrode $E4-CoC3^{\#}$) are shown in FIG. 17.

Example 29

Linear sweep voltammetry test and Faradic efficiency test under different electric potentials were conducted on samples $FeC1^{\#}$~$FeC7^{\#}$ respectively.

The LSV testing conditions included: the loading dosage of the catalytic material on the glassy carbon electrode was 0.1 $mg/cm^2$ (the employed electrodes were respectively $E4-FeC1^{\#}$~$E4-FeC7^{\#}$), 0.5M $KHCO_3$ (pH=7.3) was used as the electrolyte, 1 atm of $CO_2$ and room temperature.

The device used for the Faradic efficiency test was proton membrane (perfluorinated sulfonic acid resin Nafion® 117) separated H type electrochemical reactor. The testing conditions included: H type electrochemical reactor, $CO_2$ reaction chamber with a volume of 100 mL, 0.5M $KHCO_3$ (pH=7.3) was used as the electrolyte, 1 atm of $CO_2$, room temperature, the flow rate of $CO_2$ was 10 cc./min, the area of the electrode was 1 $cm^2$, and the loading dosage of the catalytic material on the gas diffusion electrode was 0.5 $mg/cm^2$ (the employed electrodes were respectively $E3-FeC1^{\#}$~$E3-FeC7^{\#}$).

The result shows that, the reduction currents of samples $FeC1^{\#}$~$FeC7^{\#}$ are relatively low and the selectivity for CO thereof is very bad. The selectivity is relatively good only when the bias voltage is around −0.5V (vs. RHE) (80%).

When the bias voltage is relatively high, the Faradic efficiency of reducing $CO_2$ to CO is only ~10%.

Figure 18:
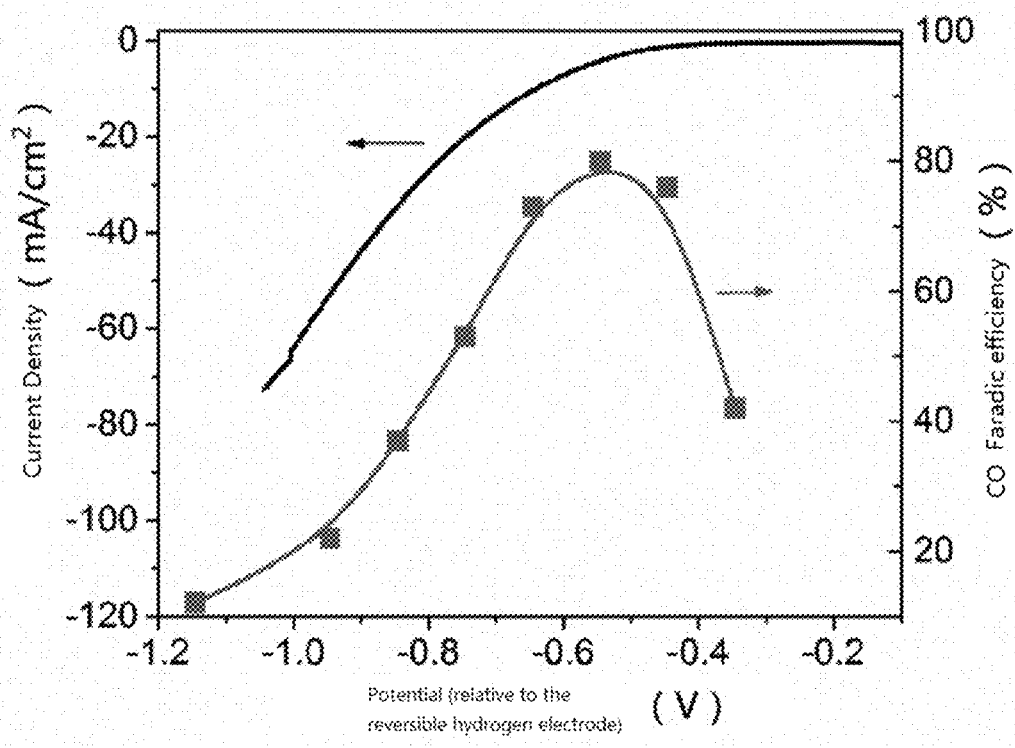
FIG. 18 are linear sweep voltammetry diagram of the graphene material inlaid with single metal atoms sample FeC3[#], and the Faradic efficiencies thereof under different electric potentials.

The results of the linear sweep voltammetry test and the Faradic efficiency test under different electric potentials of the typical sample FeC3# (corresponding to the test result of electrode E4-FeC3#) are shown in FIG. 18.

Example 30

Linear sweep voltammetry test and Faradic efficiency test under different electric potentials were conducted on sample NiC9#.

The LSV testing conditions included: the loading dosage of the catalytic material on the glassy carbon electrode was 0.1 mg/cm$^2$ (the employed electrode was E4-NiC9#), 0.5M $KHCO_3$ (pH=7.3) was used as the electrolyte, 1 atm of $CO_2$ and room temperature.

The device used for the Faradic efficiency test was proton membrane (perfluorinated sulfonic acid resin Nafion® 117) separated H type electrochemical reactor. The testing conditions included: H type electrochemical reactor, $CO_2$ reaction chamber with a volume of 100 mL, 0.5M $KHCO_3$ (pH=7.3) was used as the electrolyte, 1 atm of $CO_2$, room temperature, the flow rate of $CO_2$ was 10 cc./min, and the loading dosage of the catalytic material on the gas diffusion electrode was 0.5 mg/cm$^2$ (the employed electrode was E3-NiC9#).

Figure 19:
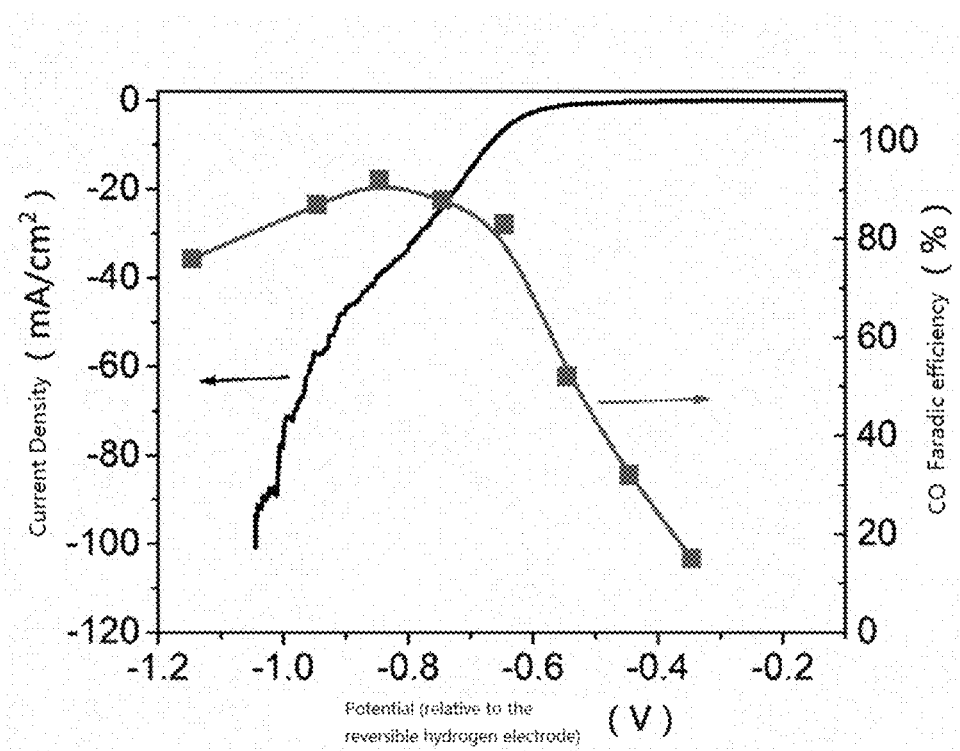
FIG. 19 are linear sweep voltammetry diagram of the graphene material inlaid with single metal atoms sample NiC9[#], and the Faradic efficiencies thereof under different electric potentials.

The results are shown in FIG. 19. It can be seen from the figure that the graphene material inlaid with single metal atoms prepared from the precursor that does not comprise amino acid has a very good catalytic activity for $CO_2$, and at high bias voltages (−0.6 to −1.2 V), the Faradic efficiency of CO generation is over 80%, which indicates a good CO selectivity. As for the reduction current, at −1.0V, the density of the current at unit area reaches 90 mA/cm$^2$.

Example 31

Linear sweep voltammetry test and Faradic efficiency test under different electric potentials were conducted on sample NiC10#.

The LSV testing conditions included: the loading dosage of the catalytic material on the glassy carbon electrode was 0.1 mg/cm$^2$ (the employed electrode was E4-NiC10#), 0.5M $KHCO_3$ (pH=7.3) was used as the electrolyte, 1 atm of $CO_2$ and room temperature.

The device used for the Faradic efficiency test was proton membrane (perfluorinated sulfonic acid resin Nafion® 117) separated H type electrochemical reactor. The testing conditions included: H type electrochemical reactor, $CO_2$ reaction chamber with a volume of 100 mL, 0.5M $KHCO_3$ (pH=7.3) was used as the electrolyte, 1 atm of $CO_2$, room temperature, the flow rate of $CO_2$ was 10 cc./min, the area of the electrode was 1 cm$^2$, and the loading dosage of the catalytic material on the gas diffusion electrode was 0.5 mg/cm$^2$ (the employed electrode was E3-NiC10#).

Figure 20:
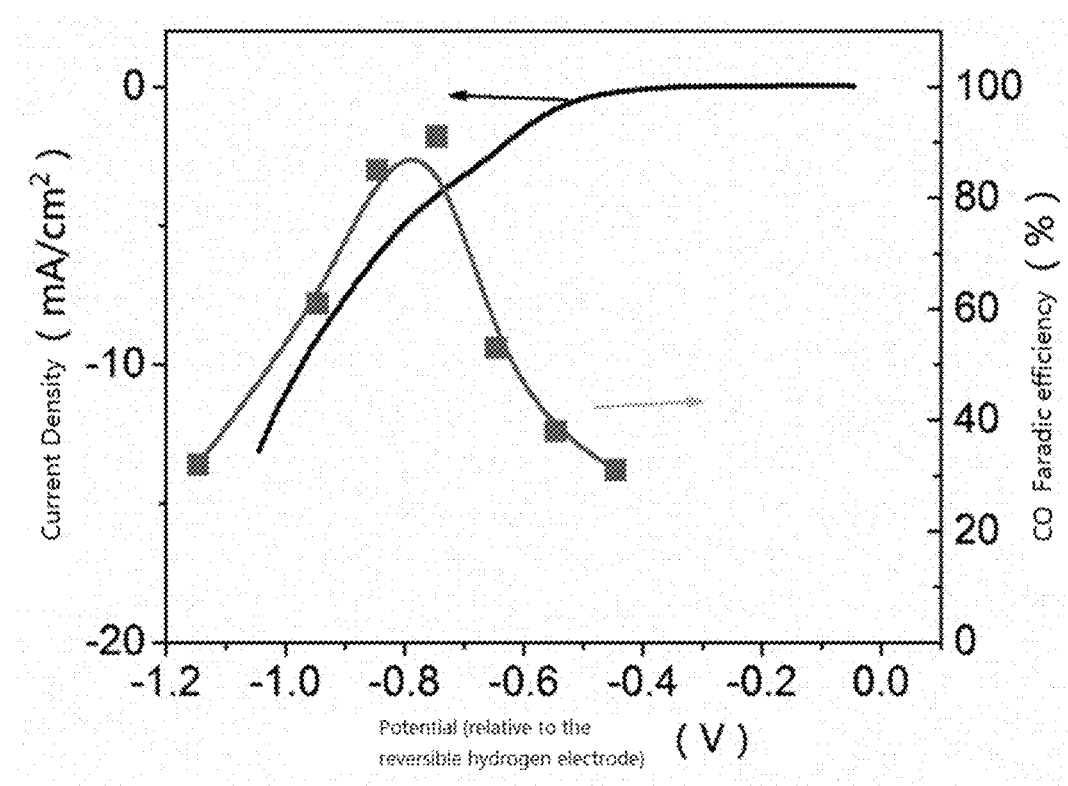
FIG. 20 are linear sweep voltammetry diagram of the graphene material inlaid with single metal atoms sample NiC10#, and the Faradic efficiencies thereof under different electric potentials.

The results are shown in FIG. 20. It can be seen from the figure that the graphene material inlaid with single metal atoms prepared from precursor in which the amino acid is glucose has a very low reduction current and a very bad selectivity for CO. Only when the bias voltage is around −0.8V (vs. RHE), it has a relatively good selectivity (~90%).

Example 32

Linear sweep voltammetry test and Faradic efficiency test under different electric potentials were conducted on sample NiC11#.

The LSV testing conditions included: the loading dosage of the catalytic material on the glassy carbon electrode was 0.1 mg/cm$^2$ (the employed electrode was E4-NiC11#), 0.5M $KHCO_3$ (pH=7.3) was used as the electrolyte, 1 atm of $CO_2$ and room temperature.

The device used for the Faradic efficiency test was proton membrane (perfluorinated sulfonic acid resin Nafion® 117) separated H type electrochemical reactor. The testing conditions included: H type electrochemial reactor, $CO_2$ reaction chamber with a volume of 100 mL, 0.5M $KHCO_3$ (pH=7.3) was used as the electrolyte, 1 atm of $CO_2$, room temperature, the flow rate of $CO_2$ was 10 cc./min, the area of the electrode was 1 cm$^2$, and the loading dosage of the catalytic material on the gas diffusion electrode was 0.5 mg/cm$^2$ (the employed electrode was E3-NiC11#).

Figure 21:
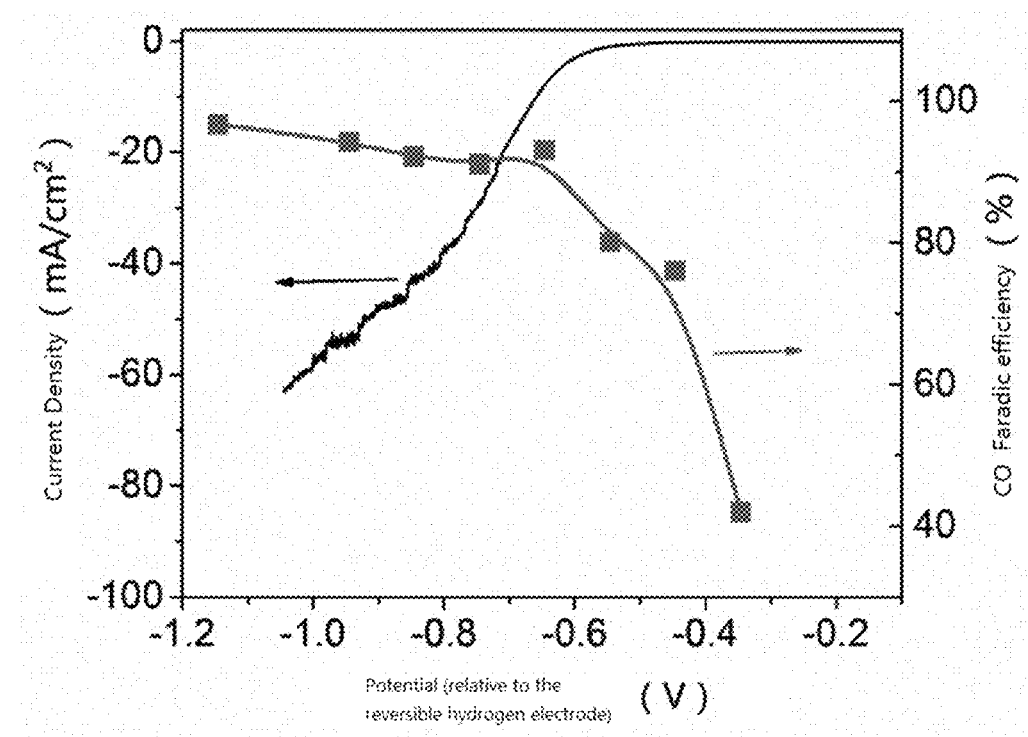
FIG. 21 are linear sweep voltammetry diagram of the graphene material inlaid with single metal atoms sample NiC11#, and the Faradic efficiencies thereof under different electric potentials.

The results are shown in FIG. 21. It can be seen from the figure that, the graphene material inlaid with single metal atoms prepared from one step high temperature carbonizing method has a good CO selectivity of over 90% at high bias voltages (−0.6 to −1.2V), but the current density thereof is relatively low, wherein at −1.0V, the density of the current at unit area is 60 mA/cm$^2$.

The above described are only several Examples of the present invention, which are not intended to be used to limit the present invention in any form. Although the present invention is disclosed with preferred Examples as above, it does not mean that the present application is limited by them. Without departing from the technical solutions of the present invention, any slight variations and modifications made by the skilled in the art who is familiar with this major by utilizing the above disclosures are all equal to the equivalent embodiments and fall into the scope of the technical solutions of the present application.

The invention claimed is:

1. A method for preparing a graphene material inlaid with single metal atoms, comprising:
    a) mixing raw material to obtain a precursor; and
    b) putting the precursor in an inactive atmosphere for high temperature carbonization to obtain the graphene material inlaid with single metal atoms;
    wherein the raw material comprises tripolycyanamide and metal salt; or
    the raw material comprises tripolycyanamide, metal salt and amino acid; or
    the raw material comprises tripolycyanamide, metal salt, amino acid and conductive carbon material.

2. The method according to claim 1, wherein the amino acid is at least one selected from the group consisting of cysteine, glycine, alanine, phenylalanine and tryptophan.

3. The method according to claim 1, wherein the metal salt is at least one selected from the group consisting of nickel salt, cobalt salt, ferric salt and ferrous salt.

4. The method according to claim 1, wherein the conductive carbon material is at least one selected from the group consisting of acetylene black, carbon fiber, carbon nanotube, carbon dust and Ketjen black.

5. The method according to claim 1, wherein the mass ratio of the substances in the raw material is:
    tripolycyanamide:metal salt:amino acid:conductive carbon material=20~100:1:0~100:0~10.

6. The method according to claim 1, wherein the mixing is ball milling mixing.

7. The method according to claim 1, wherein the inactive atmosphere comprises a gas which is at least one selected from the group consisting of nitrogen, argon, helium and xenon.

8. The method according to claim 1, wherein the high temperature carbonizing uses a one step high temperature carbonizing method or a two step high temperature carbonizing method, wherein
- the one step high temperature carbonizing method comprises: putting the precursor in inactive atmosphere, and heating to a temperature in a range from 800° C. to 1200° C. at a heating rate ranging from 1° C./min to 5° C./min, and then keeping for a time range from 0.5 hours to 5 hours; and
- the two step high temperature carbonizing method comprises: putting the precursor in inactive atmosphere, and heating to a temperature in a range from 350° C. to 650° C. at a heating rate ranging from 1° C./min to 2.5° C., and then keeping for a time range from 0.5 hours 4 hours; then heating to a temperature in a range from 800 to 1200° C. at a heating rate ranging from 1° C./min to 5° C./min and keeping for a time range from 0.5 hours to 5 hours.

9. The method according to claim 1, wherein after putting the precursor in the inactive atmosphere for high temperature carbonization; being contacted with an acidic solution for acid treatment; and then being put in the inactive atmosphere and being treated at a high temperature in a range from 700° C. to 900° C. for a time range from 10 min to 120 min, to obtain the graphene material inlaid with single metal atoms.

10. The method according to claim 9, wherein the acidic solution is at least one selected from the group consisting of hydrochloric acid solution with a concentration in a range from 0.5 mol/L to 5 mol/L, nitric acid solution with a concentration in a range from 0.5 mol/L to 5 mol/L, sulfuric acid solution with a concentration in a range from 0.5 mol/L to 5 mol/L and perchloric acid solution with a concentration in a range from 0.5 mol/L to 5 mol/L;
- the acid treatment is carried out at a temperature in a range from 40° C. to 120° C., and the acid treatment time is in a range from 1 h to 48 h.

* * * * *